US006393145B2

(12) United States Patent
Betrisey et al.

(10) Patent No.: US 6,393,145 B2
(45) Date of Patent: May 21, 2002

(54) METHODS APPARATUS AND DATA STRUCTURES FOR ENHANCING THE RESOLUTION OF IMAGES TO BE RENDERED ON PATTERNED DISPLAY DEVICES

(75) Inventors: Claude Betrisey, Redmond; Bodin Dresevic, Bellevue; Donald P. Mitchell, Bellevue; John C. Platt, Bellevue, all of WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/364,365

(22) Filed: Jul. 30, 1999

Related U.S. Application Data

(60) Provisional application No. 60/115,572, filed on Jan. 12, 1999.

(51) Int. Cl.[7] .................................................. G06K 9/00

(52) U.S. Cl. ........................................ 382/162; 382/167

(58) Field of Search ................................ 382/162, 163, 382/164, 165, 166, 167; 345/418, 419, 426, 502; 358/515–526

(56) References Cited

U.S. PATENT DOCUMENTS

| | | | | |
|---|---|---|---|---|
| 4,136,359 A | | 1/1979 | Wozniak | 358/17 |
| 4,217,604 A | | 8/1980 | Wozniak | 358/16 |
| 4,278,972 A | | 7/1981 | Wozniak | 340/703 |
| 4,463,380 A | * | 7/1984 | Hooks, Jr. | 358/160 |
| 5,057,739 A | | 10/1991 | Shimada et al. | 313/477 R |
| 5,122,783 A | | 6/1992 | Bassetti, Jr. | 340/701 |
| 5,254,982 A | | 10/1993 | Feigenblatt et al. | 345/148 |
| 5,298,915 A | | 3/1994 | Bassetti, Jr. et al. | 345/149 |

(List continued on next page.)

OTHER PUBLICATIONS

Abram, G. et al. "Efficient Alias–free Rendering using Bit–masks and Look–Up Tables" *San Francisco,* vol. 19, No. 3, 1985 (pp. 53–59).

Ahumada, A.J. et al. "43.1: A Simple Vision Model for Inhomogeneous Image–Quality Assessment" *1998 SID.*

Barbier, B. "25.1: Multi–Scale Filtering for Image Quality on LCD Matrix Displays" *SID 96 Digest.*

(List continued on next page.)

*Primary Examiner*—Phuoc Tran
*Assistant Examiner*—Amir Alavi
(74) *Attorney, Agent, or Firm*—Workman, Nydegger & Seeley

(57) ABSTRACT

Techniques for improving the resolution of images (either analog images, analytic images, or images having a higher resolution than that of a display device) to be rendered on patterned displays. In one aspect of the present invention, an overscaling or oversampling process may accept analytic character information, such as contours for example, and a scale factor or grid and overscale or oversample the analytic character information to produce an overscaled or oversampled image. The overscaled or oversampled image generated has a higher resolution than the display upon which the character is to be rendered. Displaced samples of the overscaled or oversampled image are then combined (or filtered). An analytic image, such as a line drawing for example, may be applied to the oversampling/overscaling process as was the case with the character analytic image. However, since the analytic image may have different units than that of the character analytic image, the scale factor applied may be different. Since an ultra resolution image is already "digitized", that is, not merely mathematically expressed contours or lines between points, it may be applied directly to a process for combining displaced samples of the ultra-resolution image to generate another ultra-resolution image (or an image with sub-pixel information). The functionality of the overscaling/oversampling process and the processes for combining displaced samples may be combined into a single step analytic to digital sub-pixel resolution conversion process.

29 Claims, 30 Drawing Sheets

U.S. PATENT DOCUMENTS

| | | | | | |
|---|---|---|---|---|---|
| 5,334,996 | A | | 8/1994 | Tanigaki et al. | 345/152 |
| 5,341,153 | A | | 8/1994 | Benzschawel et al. | 345/152 |
| 5,349,451 | A | | 9/1994 | Dethardt | 358/518 |
| 5,467,102 | A | | 11/1995 | Kuno et al. | 345/1 |
| 5,543,819 | A | | 8/1996 | Farwell et al. | 345/150 |
| 5,548,305 | A | | 8/1996 | Rupel | 345/150 |
| 5,555,360 | A | | 9/1996 | Kumazaki et al. | 395/143 |
| 5,633,654 | A | | 5/1997 | Kennedy, Jr. et al. | 345/114 |
| 5,689,283 | A | | 11/1997 | Shirochi | 345/132 |
| 5,767,837 | A | | 6/1998 | Hara | 345/152 |
| 5,821,913 | A | | 10/1998 | Mamiya | 345/88 |
| 5,847,698 | A | | 12/1998 | Reavey et al. | 345/173 |
| 5,867,166 | A | * | 2/1999 | Myhrvold et al. | 345/419 |
| 5,870,097 | A | * | 2/1999 | Snyder et al. | 345/426 |
| 5,894,300 | A | | 4/1999 | Takizawa | 345/115 |
| 5,949,643 | A | | 9/1999 | Batio | 361/681 |
| 5,963,185 | A | | 10/1999 | Havel | 345/83 |
| 5,977,977 | A | * | 11/1999 | Kajiya et al. | 345/418 |
| 6,008,820 | A | * | 12/1999 | Chauvin et al. | 345/502 |

OTHER PUBLICATIONS

Barten, P.G.J. "P–8: Effect of Gamma on Subjective Image Quality" *SID 96 Digest*.

Beck. D.R. "Motion Dithering for Increasing Perceived Image Quality for Low–Resolution Displays" *1998 SID*.

Bedford–Roberts, J. et al. "10.4: Testing the Value of Gray–Scaling for Images of Handwriting" *SID 95 Digest*, pp. 125–128.

Chen, L.M. et al. "Visual Resolution Limits for Color Matrix Displays" *Displays—Technology and Applications*, vol. 13, No. 4, 1992, pp. 179–186.

Cordonnier, V. "Antialiasing Characters by Pattern Recognition" *Proceedings of the S.I.D.* vol. 30, No. 1, 1989, pp. 23–28.

Cowan, W. "Chapter 27, Displays for Vision Research" *Handbook of Optics, Fundamentals, Techniques & Design*, Second Edition, vol. 1, pp. 27.1–27.44.

Crow, F.C. "The Use of Grey Scale for Improved Raster Display of Vectors and Characters" *Computer Graphics*, vol. 12, No. 3, Aug. 1978, pp. 1–5.

Feigenblatt, R.I., "Full–color Imaging on amplitude–quantized color mosaic displays" *Digital Image Processing Applications SPIE* vol. 1075 (1989) pp. 199–205.

Gille, J. et al. "Grayscale/Resolution Tradeoff for Text: Model Predictions" *Final Report*, Oct. 1992–Mar. 1995.

Gould, J.D. et al. "Reading From CRT Displays Can Be as Fast as Reading From Paper" *Human Factors*, vol. 29, No. 5, pp. 497–517, Oct. 1987.

Gupta, S. et al. "Anti–Aliasing Characters Displayed by Text Terminals" *IBM Technical Disclosure Bulletin*, May 1983 pp. 6434–6436.

Hara, Z. et al. "Picture Quality of Different Pixel Arrangements for Large–Sized Matrix Displays" *Electronics and Communications in Japan*, Part 2, vol. 77, No. 7, 1974, pp. 105–120.

Kajiya, J. et al. "Filtering High Quality Text For Display on Raster Scan Devices" *Computer Graphics*, vol. 15, No. 3, Aug. 1981, pp. 7–15.

Kato, Y. et al. "13:2 A Fourier Analysis of CRT Displays Considering the Mask Structure, Beam Spot Size, and Scan Pattern"(c) *1998 SID*.

Krantz J. et al. "Color Matrix Display Image Quality: The Effects of Luminance and Spatial Sampling" *SID 90 Digest*, pp. 29–32.

Kubala, K. et al. "27:4: Investigation Into Variable Addressability Image Sensors and Display Systems" *1998 SID*.

Mitchell, D.P. "Generating Antialiased Images at Low Sampling Densities" *Computer Graphics*, vol. 21, No. 4, Jul. 1987, pp. 65–69.

Mitchell, D.P. et al., "Reconstruction Filters in Computer Graphics", *Computer Graphics*, vol. 22, No. 4, Aug. 1988, pp. 221–228.

Morris R.A., et al. "Legibility of Condensed Perceptually–tuned Grayscale Fonts" *Electronic Publishing, Artistic Imaging, and Digital Typography*, Seventh International Conference on Electronic Publishing, Mar. 30–Apr. 3, 1998, pp. 281–293.

Murch, G. et al., "7.1: Resolution and Addressability: How Much is Enough?" *SID 85 Digest*, pp. 101–103.

Naiman, A., "Some New Ingredients for the Cookbook Approach to Anti–Aliased Text" *Proceedings Graphics Interface 81*, Ottawa, Ontario, May 28–Jun. 1, 1984, pp. 99–108.

Naiman, A, et al. "Rectangular Convolution for Fast Filtering of Characters" *Computer Graphics*, vol. 21, No. 4, Jul. 1987, pp. 233–242.

Naiman, A.C. "10:1 The Visibility of Higher–Level Jags" *SID 95 Digest* pp. 113–116.

Peli, E. "35.4: Luminance and Spatial–Frequency Interaction in the Perception of Constrast", *SID 96 Digest*.

Pringle, A., "Aspects of Quality in the Design and Production of Text", *Association of Computer Machinery* 1979, pp. 63–70.

Rohellec, J. Le et al. "35.2: LCD Legibility Under Different Lighting Conditions as a Function of Character Size and Contrast" *SID 96 Digest*.

Schmandt, C. "Soft Typography Information Processing 80", *Proceedings of the IFIP Congress* 1980, pp. 1027–1031.

Sheedy, J.E. et al. "Reading Performance and Visual Comfort with Scale to Grey Compared with Black–and–White Scanned Print" *Displays*, vol. 15, No. 1, 1994, pp. 27–30.

Sluyterman, A.A.S. "13:3 A Theoretical Analysis and Empirical Evaluation of the Effects of CRT Mask Structure on Character Readability" (c) *1998 SID*.

Tung. C., "Resolution Enhancement Technology in Hewlett–Packard LaserJet Printers" *Proceedings of the SPIE—The International Society for Optical Engineering*, vol. 1912, pp. 440–448.

Warnock, J.E. "The Display of Characters Using Gray Level Sample Arrays", *Association of Computer Machinery*, 1980, pp. 302–307.

Whitted, T. "Anti–Aliased Line Drawing Using Brush Extrusion" *Computer Graphics*, vol. 17, No. 3, Jul. 1983, pp. 151–156.

Yu, S., et al. "43:3 How Fill Factor Affects Display Image Quality" (c) *1998 SID*.

"Cutting Edge Display Technolgoy—The Diamond Vision Difference" www.amasis.com/diamondvision/technical.html, Jan. 12, 1999.

"Exploring the Effect of Layout on Reading from Screen" http://fontweb/internal/repository/research/explore.asp?RES=ultra, 10 pages, Jun. 3, 1998.

"How Does Hinting Help?" http://www.microsoft.com/typography/hinting/how.htm/fname=%20&fsize, Jun. 30, 1997.

"Legibility on screen: A report on research into line length, document height and number of columns" http://fontweb/internal/repository/research/scrnlegi.asp?RES=ultra Jun. 3, 1998.

"The Effect of Line Length and Method of Movement on reading from screen" http://fontweb/internal/repository/research/linelength.asp?RES=ultra, 20 pages, Jun. 3, 1998.

"The Legibility of Screen Formats: Are Three Columns Better Than One?" http://fontweb/internal/repository/research/scrnformat.asp?RES=ultra, 16 pages, Jun. 3, 1998.

"The Raster Tragedy at Low Resolution"0 http://www.microsoft.com/typography/tools/trtalr.htm?fname=%20&fsize.

"The TrueType Rasterizer" http://www.microsoft.com/typography.tools/what/raster.htm?fname=%20&fsize, Jun. 30, 1997.

"TrueType fundamentals" http://www.microsoft.com/OTSPEC/TTCHO1.htm?fname=%20&fsize= Nov. 16, 1997.

"True Type Hinting" http://www.microsoft.com/typography/hinting/hinting.htm Jun. 30, 1997.

"Typographic Research" http://fontweb/internal/repository/research/research2.asp?RES=ultra Jun. 3, 1998.

* cited by examiner

METHODS APPARATUS AND DATA STRUCTURES FOR ENHANCING THE RESOLUTION OF IMAGES TO BE RENDERED ON PATTERNED DISPLAY DEVICES

This application claims the benefit of U.S. Provisional Patent Application Ser. No. 60/115,572, filed Jan. 12, 1999, entitled "RGB Decimation Algorithm."

§ 1. BACKGROUND OF THE INVENTION

§ 1.1 Field of the Invention

The present invention concerns techniques for enhancing the resolution of images, such as fonts, line drawings, or black-and-white or full-color images for example, to be rendered on a patterned output device, such as a flat panel video monitor or an LCD video monitor for example.

§ 1.2 Related Art

The present invention may be used in the context of patterned output devices such as flat panel video monitors, or LCD video monitors for example. In particular, the present invention may be used as a part of processing to produce higher resolution images, such as more legible text for example, on LCD video monitors. Although the structure and operation of display devices in general, and flat panel display devices, such as LCD monitors for example, in particular, are known by those skilled in the art, they are discussed in § 1.2.1 below for the reader's convenience. Then, known ways of rendering text, line art and graphics on such displays are discussed in §§ 1.2.2, 1.2.3 and 1.2.4 below.

§ 1.2.1 Display Devices

Color display devices have become the principal display devices of choice for most computer users. Color is typically displayed on a monitor by operating the display device to emit light (such as a combination of red, green, and blue light for example) which results in one or more colors being perceived by the human eye.

Although color video monitors in general, and LCD video monitors in particular, are known to those skilled in the art, they are introduced below for the reader's convenience. In § 1.2.1.1 below, cathode ray tube (or CRT) video monitors are first introduced. Then, in § 1.2.1.2 below, LCD video monitors are introduced.

§ 1.2.1.1 CRT Video Monitors

Cathode ray tube (CRT) display devices include phosphor coatings which may be applied as dots in a sequence on the screen of the CRT. A different phosphor coating is normally associated with the generation of different colors, such as red, green, and blue for example. Consequently, repeated sequences of phosphor dots are defined on the screen of the video monitor. When a phosphor dot is excited by a beam of electrons, it will generate its associated color, such as red, green and blue for example.

The term "pixel" is commonly used to refer to one spot in a group of spots, such as rectangular grid of thousands of such spots for example. The spots are selectively activated to form an image on the display device. In most color CRTs, a single triad of red, green and blue phosphor dots cannot be uniquely selected. Consequently, the smallest possible pixel size will depend on the focus, alignment and bandwidth of the electron guns used to excite the phosphor dots. The light emitted from one or more triads of red, green and blue phosphor dots, in various arrangements known for CRT displays, tend to blend together giving, at a distance, the appearance of a single colored light source.

In color displays, the intensity of the light emitted from the additive primary colors (such as red, green, and blue) can be varied to achieve the appearance of almost any desired color pixel. Adding no color, i.e., emitting no light, produces a black pixel. Adding 100 percent of all three (3) colors produces a white pixel.

Having introduced color CRT video monitors, color LCD video monitors are now introduced in § 1.2.1.2 below.

§ 1.2.1.2 LCD Video Monitors

Portable computing devices (also referred to generally as computing appliances or untethered computing appliances) often use liquid crystal displays (LCDs) or other flat panel display devices, instead of CRT displays. This is because flat panel displays tend to be smaller and lighter than CRT displays. In addition, flat panel displays are well suited for battery powered applications since they typically consume less power than comparably sized CRT displays. Further, LCD flat panel monitors are even becoming more popular in the desktop computing environment.

Color LCD displays are examples of display devices which distinctly address elements (referred to herein as pixel sub-components, pixel sub-elements, or simply, emitters) to represent each pixel of an image being displayed. Normally, each pixel element of a color LCD display includes three (3) non-square elements. More specifically, each pixel element may include adjacent red, green and blue (RGB) pixel sub-components. Thus, a set of RGB pixel sub-components together define a single pixel element.

Known LCD displays generally include a series of RGB pixel sub-components which are commonly arranged to form stripes along the display. The RGB stripes normally run the entire length of the display in one direction. The resulting RGB stripes are sometimes referred to as "RGB striping". Common LCD monitors used for computer applications, which are wider than they are tall, tend to have RGB vertical stripes. Naturally, however, some LCD monitors may have RGB horizontal stripes.

FIG. 1 illustrates a known LCD screen 100 comprising pixels arranged in a plurality of rows (R1–R12) and columns (C1–C16). That is, a pixel is defined at each row-column intersection. Each pixel includes a red pixel sub-component, depicted with moderate stippling, a green component, depicted with dense stippling, and a blue component, depicted with sparse stippling. FIG. 2 illustrates the upper left hand portion of the known display 100 in greater detail. Note how each pixel element, such as, the (R2, C4) pixel element for example, comprises three (3) distinct sub-element or sub-components; a red sub-component 206, a green sub-component 207 and a blue sub-component 208. In the exemplary display illustrated, each known pixel sub-component 206, 207, 208 is ⅓, or approximately ⅓, the width of a pixel while being equal, or approximately equal, in height to the height of a pixel. Thus, when combined, the three ⅓ width, full height, pixel sub-components 206, 207, 208 define a single pixel element.

As illustrated in FIG. 1, one known arrangement of RGB pixel sub-components 206, 207, 208 form what appear to be vertical color stripes on the display 100. Accordingly, the arrangement of ⅓ width color sub-components 206, 207, 208, in the known manner illustrated in FIGS. 1 and 2, exhibit what is sometimes called "vertical striping".

In known systems, the RGB pixel sub-components are generally used as a group to generate a single colored pixel corresponding to a single sample of the image to be represented. More specifically, in known systems, luminous intensity values for all the pixel sub-components of a pixel element are generated from a single sample of the image to be rendered.

Having introduced the general structure and operation of known LCD displays, known techniques for rendering text on such LCD displays, as well as perceived shortcomings of such known techniques, are introduced in § 1.2.2 below. Then, known techniques for rendering line art or images on such LCD displays, as well as perceived shortcomings of such known techniques, are introduced in § 1.2.3 below. Finally, rendering graphics is introduced in § 1.2.4 below.

§ 1.2.2 Rendering Text on Displays

The expression of textual information using font sets is introduced in § 1.2.2.1 below. Then, the rendering of textual information using so-called pixel precision and perceived shortcomings of doing so are introduced in § 1.2.2.2 below.

§ 1.2.2.1. Font Sets

A "font" is a set of characters of the same typeface (such as Times Roman, Courier New, etc.), the same style (such as italic), the same weight (such as bold and, strictly speaking, the same size). Characters may include symbols, such as the "Parties MT", "Webdings", and "Wingdings" symbol groups found on the Word™ word processor from Microsoft Corporation of Redmond, Wash. for example. A "typeface" is a specific named design of a set of printed characters (e.g., Helvetica Bold Oblique), that has a specified obliqueness (i.e., degree of slant) and stoke weight (i.e., line thickness). Strictly speaking, a typeface is not the same as a font, which is a specific size of a specific typeface (such as 12-point Helvetica Bold Oblique). However, since some fonts are "scalable", the terms "font" and "typeface" may sometimes be used interchangeably. A "typeface family" is a group of related typefaces. For example, the Helvetica family may include Helvetica, Helvetica Bold, Helvetica Oblique and Helvetica Bold Oblique.

Many modern computer systems use font outline technology, such as scalable fonts for example, to facilitate the rendering and display of text. TrueType™ fonts from Microsoft Corporation of Redmond, Wash. are an example of such technology. In such systems, various font sets, such as "Times New Roman," "Onyx," "Courier New," etc. for example, may be provided. The font set normally includes an analytic outline representation, such as a series of contours for example, for each character which may be displayed using the provided font set. The contours may be straight lines or curves for example. Curves may be defined by a series of points that describe second order Bezier-splines for example. The points defining a curve are typically numbered in consecutive order. The ordering of the points may be important. For example, the character outline may be "filled" to the right of curves when the curves are followed in the direction of increasing point numbers. Thus the analytic character outline representation may be defined by a set of points and mathematical formulas.

The point locations may be described in "font units" for example. A "font unit" may be defined as the smallest measurable unit in an "em" square, which is an imaginary square that is used to size and align glyphs (a "glyph" can be thought of as a character). FIG. 3 illustrates an "em" square 310 around a character outline 320 of the letter Q. Historically, an "em" was approximately equal to the width of a capital M. Further, historically, glyphs could not extend beyond the em square. More generally, however, the dimensions of an "em" square are those of the full body height 340 of a font plus some extra spacing. This extra spacing was provided to prevent lines of text from colliding when typeset without extra leading was used. Further, in general, portions of glyphs can extend outside of the em square. The coordinates of the points defining the lines and curves (or contours) may be positioned relative to a baseline 330 (Y coordinate=0). The portion of the character outline 320 above the baseline 330 is referred to as the "ascent" 342 of the glyph. The portion of the character outline 320 below the baseline 330 is referred to as the "decent" 344 of the glyph. Note that in some languages, such as Japanese for example, the characters sit on the baseline, with no portion of the character extending below the baseline.

The stored outline character representation normally does not represent space beyond the maximum horizontal and vertical boundaries of the character (also referred to as "white space" or "side bearings"). Therefore, the stored character outline portion of a character font is often referred to as a black body (or BB). A font generator is a program for transforming character outlines into bitmaps of the style and size required by an application. Font generators (also referred to as "rasterizers") typically operate by scaling a character outline to a requested size and can often expand or compress the characters that they generate.

In addition to stored black body character outline information, a character font normally includes black body size, black body positioning, and overall character width information. Black body size information is sometimes expressed in terms of the dimensions of a bounding box used to define the vertical and horizontal borders of the black body.

Certain terms used to define a character are now defined with reference to FIG. 4, which illustrates character outlines of the letters A and I 400. Box 408 is a bounding box which defines the size of the black body 407 of the character (A). The total width of the character (A), including white space to be associated with the character (A), is denoted by an advance width (or AW) value 402. The advance width typically starts to a point left of the bounding box 408. This point 404 is referred to as the left side bearing point (or LSBP). The left side bearing point 404 defines the horizontal starting point for positioning the character (A) relative to a current display position. The horizontal distance 410 between the left end of the bounding box 408 and the left side bearing point 404 is referred to as the left side bearing (or LSB). The left side bearing 410 indicates the amount of white space to be placed between the left end of the bounding box 408 of a current character (A) and the right side bearing point of the preceding character (not shown). The point 406 to the right of the bounding box 408 at the end of the advance width 402 is referred to as the right side bearing point (or RSBP). The right side bearing point 406 defines the end of the current character (A) and the point at which the left side bearing point 404' of the next character (I) should be positioned. The horizontal distance 412 between the right end of the bounding box 408 and the right side bearing point 406 is referred to as the right side bearing (or RSB). The right side bearing 412 indicates the amount of white space to be placed between the right end of the bounding box 408 of a current character (A) and the left side bearing point 404' of the next character (I). Note that the left and right side bearings may have zero (0) or negative values. Note also that in characters used in Japanese and other Far Eastern languages, metrics analogous to advance width, left side bearing and right side bearing—namely, advance height (AH), top side bearing (TSB) and bottom side bearing (BSB)—may be used.

As discussed above, a scalable font file normally includes black body size, black body positioning, and overall character width information for each supported character. The black body size information may include horizontal and vertical size information expressed in the form of bounding box 408 dimensions. The black body positioning information may expressed as a left side bearing value 410. Overall character width information may be expressed as an advance width 402.

§ 1.2.2.2 Rendering Text to Pixel Precision

In the following, known techniques for rendering text on an output device such as a display (or printer) is described in § 1.2.2.2.1. Then, an example illustrating round-off errors which may occur when using such known techniques is described in § 1.2.2.2.2.

§ 1.2.2.2.1 Technique for Rendering Text

FIG. 5 is a high level diagram of processes that may be performed when an application requests that text be rendered on a display device. Basically, as will be described in more detail below, text may be rendered by: (i) loading a font and supplying it to a rasterizer; (ii) scaling the font outline based on the point size and the resolution of the display device; (iii) applying hints to the outline; (iv) filling the grid fitted outline with pixels to generate a raster bitmap; (v) scanning for dropouts (optional); (vi) caching the raster bitmap; and (vii) transferring the raster bitmap to the display device.

In the case of scaling fonts, the font unit coordinates used to define the position of points defining contours of a character outline are scaled to device specific pixel coordinates. That is, when the resolution of the em square is used to define a character outline, before that character can be displayed, it must be scaled to reflect the size, transformation and the characteristics of the output device on which it is to be rendered. The scaled outline describes the character outline in units that reflect the absolute unit of measurement used to measure pixels of the output device, rather than the relative system of measurement of font units per em. Specifically, with known techniques, values in the em square are converted to values in the pixel coordinate system in accordance with the following formula:

$$\text{size in pixels} = \frac{\text{character outline size} \cdot \text{point size} \cdot \text{output device resolution}}{72 \text{ points per inch} \cdot \text{number of font units per em}} \tag{1}$$

where the character outline size is in font units, and output device resolution is in pixels/inch.

The resolution of the output device may be specified by the number of dots or pixels per inch (dpi). For example, a VGA video monitor may be treated as a 96 dpi device, a laser printer may be treated as a 300 dpi device, an EGA video monitor may be treated as a 96 dpi device in the horizontal (X) direction, but a 72 dpi device in the vertical (Y) direction. The font units per em may (but need not) be chosen to be a power of two (2), such as 2048 (=$2^{11}$) for example.

FIG. 5 is a high level diagram of processes which may be performed by a known text rendering system. As shown in FIG. 5, an application process 510, such as a word processor or contact manager for example, may request that text be displayed and may specify a point size for the text. Although not shown in FIG. 5, the application process 510 may also request a font name, background and foreground colors and a screen location at which the text is to be rendered. The text and, if applicable, the point size, 512 are provided to a graphics display interface (or GDI) process (or more generally, a graphics display interface) 522. The GDI process 522 uses display information 524 (which may include such display resolution information as pixels per inch on the display) and character information 525 (which may be a character outline information which may be represented as points defining a sequence of contours such as lines and curves, advance width information and left side bearing information) to generate glyphs (or to access cached glyphs which have already been generated). Glyphs may include a bitmap of a scaled character outline (or a bounding box 308 containing black body 307 information), advance width 302 information, and left side bearing 310 information. Each of the bits of the bitmap may have associated red, green and blue luminous intensity values. The graphics display interface process 522 is described in more detail in § 1.2.2.2.1.1 below. The graphics display interface process 522, the display information 524, and the glyph cache 526 may be a part of, and effected by, an operating system, such as the Windows® CE or Windows NT® operating systems (from Microsoft Corporation of Redmond, Wash.) for example.

Glyphs (also referred to as digital font representations) 528' or 528, either from the glyph cache 526 or from the graphics display interface process 522, are then provided to a display driver management process (or more generally, a display driver manager) 535. The display driver management process 535 may be a part of a display (or video) driver 530. Typically, a display driver 530 may be software which permits a computer operating system to communicate with a particular video display. Basically, the display driver management process 535 may invoke a color palette selection process 538. These processes 535 and 538 serve to convert the character glyph information into the actual pixel intensity values. The display driver management process 535 receives, as input, glyphs and display information 524'. The display information 524' may include, for example, foreground/background color information, color palette information and pixel value format information.

The processed pixel values may then be forwarded as video frame part(s) 540 along with screen (and perhaps window) positioning information (e.g., from the application process 510 and/or operating system), to a display (video) adapter 550. A display adapter 550 may include electronic components that generate a video signal sent to the display 560. A frame buffer process 552 may be used to store the received video frame part(s) in a screen frame buffer 554 of the display adapter 550. Using the screen frame buffer 554 allows a single image of, e.g., a text string, to be generated from glyphs representing several different characters. The video frame(s) from the screen frame buffer 554 is then provided to a display adaptation process 553 which adapts the video for a particular display device. The display adaptation process 558 may also be effected by the display adapter 550.

Finally, the adapted video is presented to the display device 560, such as an LCD display for example, for rendering.

Having provided an overview of a text rendering system, the graphics display interface process 522 is now described in more detail in § 1.2.2.2.1.1 below. The processes which may be performed by the display driver are then described in more detail in § 1.2.2.2.1.2 below.

§ 1.2.2.2.1.1 Graphics Display Interface

FIG. 6 illustrates processes that may be performed by a graphics display interface (or GDI) process 522, as well as data that may be used by the GDI process 522. As shown in FIG. 6, the GDI process 522 may include a glyph cache management process (or more generally, a glyph cache manager) 610 which accepts text, or more specifically, requests to display text, 512. The request may include the point size of the text. The glyph cache management process 610 forwards this request to the glyph cache 526. If the glyph cache 526 includes the glyph corresponding to the requested text character, it provides it for downstream processing. If, on the other hand, the glyph cache 526 does not have the glyph corresponding to the requested text character, it so informs the glyph cache management process 610 which, in turn, submits a request to generate the needed glyph to the type rasterization process (or more generally, a type rasterizer) 620. Basically, a type rasterization process 620 may be effected by hardware and/or software and converts a character outline (which may, recall, include points which define contours such as lines and curves based on mathematical formulas) into a raster (that is, a bitmapped) image. Each pixel of the bitmap image may have a color value and a brightness for example. A type rasterization process is described in § 1.2.2.2.1.1.1 below.

§ 1.2.2.2.1.1.1 Rasterizer

To reiterate, the type rasterization process 620 basically transforms character outlines into bitmapped images. The scale of the bitmap may be based on the point size of the font and the resolution (e.g., pixels per inch) of the display device 560. The text, font, and point size information may be obtained from the application 510, while the resolution of the display device 560 may be obtained from a system configuration or display driver file or from monitor settings stored in memory by the operating system. The display information 524 may also include foreground/background color information, gamma values, color palette information and/or display adapter/display device pixel value format information. To reiterate, this information may be provided from the graphics display interface 522 in response to a request from the application process 510. If, however, the background of the text requested is to be transparent (as opposed to Opaque), the background color information is what is being rendered on the display (such as a bitmap image or other text for example) and is provided from the display device 560 or the video frame buffer 554.

Basically, the rasterization process may include two (2) or three (3) sub-steps or sub-processes. First, the character outline is scaled using a scaling process 622. This process is described below. Next, the scaled image generated by the scaling process 622 may be placed on a grid and have portions extended or shrunk using a hinting process 626. This process is also described below. Then, an outline fill process 628 is used to fill the grid-fitted outline to generate a raster bitmap. This process is also described below.

When scaling fonts in conventional systems such as TrueType™ from Microsoft Corporation of Redmond, Wash., the font unit coordinates used to define the position of points defining contours of a character outline were scaled to device specific pixel coordinates. That is, since the resolution of the em square was used to define a character outline, before that character could be displayed, it was scaled to reflect the size, transformation and the characteristics of the output device on which it was to be rendered. Recall that the scaled outline describes the character outline in units that reflect the absolute unit of measurement used to measure pixels of the output device, rather than the relative system of measurement of font units per em. Thus, recall that values in the em square were converted to values in the pixel coordinate system in accordance with the following formula:

$$\text{size in pixels} = \frac{\text{character outline size} \cdot \text{point size} \cdot \text{output device resolution}}{72 \text{ points per inch} \cdot \text{number of font units per em}} \quad (1)$$

where the character outline size is in font units, and output device resolution is in pixels/inch.

Recall that the resolution of an output device may be specified by the number of dots or pixels per inch (dpi).

The purpose of hinting (also referred to as "instructing a glyph") is to ensure that critical characteristics of the original font design are preserved when the glyph is rendered at different sizes and on different devices. Consistent stem weights, consistent "color" (that is, in this context, the balance of black and white on a page or screen), even spacing, and avoiding pixel dropout are common goals of hinting. In the past, uninstructed, or unhinted, fonts would generally produce good quality results at sufficiently high resolutions and point sizes. However, for many fonts, legibility may become compromised at smaller point sizes on lower resolution displays. For example, at low resolutions, with few pixels available to describe the character shapes, features such as stem weights, crossbar widths and serif details can become irregular, or inconsistent, or even missed completely.

Basically, hinting may involve "grid placement" and "grid fitting". Grid placement is used to align a scaled character within a grid, that is used by a subsequent outline fill process 628, in a manner intended to optimize the accurate display of the character using the available sub-pixel elements. Grid fitting involves distorting character outlines so that the character better conforms to the shape of the grid. Grid fitting ensures that certain features of the glyphs are regularized. Since the outlines are only distorted at a specified number of smaller sizes, the contours of the fonts at high resolutions remain unchanged and undistorted.

In grid placement, sub-pixel element boundaries may be treated as boundaries along which characters can, and should, be aligned or boundaries to which the outline of a character should be adjusted.

Other known hinting instructions may also be carried out on the scaled character outline.

In an implementation of anti-aliased text for TrueType™ fonts supported in Windows NT™ 4, the hinted image 627 is overscaled four (4) times in both the X and Y directions. The image is then sampled, i.e. for every physical pixel, which is represented by 4-by-4 portion of the grid in an overscaled image, the blend factor alpha is computed for that pixel by simply counting the squares having centers which lie within the glyph outline and dividing the result by 16. As a result, the foreground/background blend factor alpha is expressed as k/16 and is computed for every pixel. This whole process is also called standard anti-aliasing filtering. Unfortunately, however, such standard anti-aliasing tends to blur the image. Similar implementation exists in Windows 95 and Windows 98, and the only difference is that the image is overscaled two (2) times in both X and Y, so that alpha for every pixel is expressed as k/4, where k is a number of squares within the glyph outline.

The outline fill process 628 basically determines whether the center of each pixel is enclosed within the character outline. If the center of a pixel is enclosed within the character outline, that pixel is turned ON. Otherwise, the pixel is left OFF. The problem of "pixel dropout" may occur whenever a connected region of a glyph interior contains two ON pixels that cannot be connected by a straight line that passes through only those ON pixels. Pixel dropout may be overcome by looking at an imaginary line segment connected two adjacent pixel centers, determining whether the line segment is intersected by both an on-transition contour and off-transition contour, determining whether the two contour lines continue in both directions to cut other line segments between adjacent pixel centers and, if so, turning pixels ON.

The rasterized glyphs are then cached in glyph cache 526. Caching glyphs is useful. More specifically, since most Latin fonts have only about 200 characters, a reasonably sized cache makes the speed of the rasterizer almost meaningless. This is because the rasterizeer runs once, for example when a new font or point size is selected. Then, the bitmaps are transferred out of the glyph cache 526 as needed.

The scaling process 622 of the known system just described may introduce certain rounding errors. Constraints are enforced by (i) scaling the size and positioning information included in a character font as a function of the point size and device resolution as just described above, and (ii) then rounding the size and positioning values to integer multiples of the pixel size used in the particular display device. Using pixel size units as the minimum (or "atomic") distance unit produces what is called "pixel precision" since the values are accurate to the size of one (1) pixel.

Rounding size and positioning values of character fonts to pixel precision introduces changes, or errors, into displayed images. Each of these errors may be up to ½ a pixel in size (assuming that values less than ½ a pixel are rounded down and values greater than or equal to ½ a pixel are rounded up). Thus, the overall width of a character may be less precise than desired since the character's AW is (may be) rounded. In addition, the positioning of a character's black body within the total horizontal space allocated to that character may be sub-optimal since the left side bearing is (may be) rounded. At small point sizes, the changes introduced by rounding using pixel precision can be significant.

§ 1.2.3 Rendering Line Drawings

As was the case when scaling character outlines, when rendering line drawings, the boundaries between the (black) line portions and the (white) background are typically forced to correspond to pixel boundaries. This may be done by rounding the position values of the (black) line portions to integer multiples of the pixel size used in the particular display device. Referring to FIG. 7, this may be done by a scaling process 710 which accepts analytic image information 702 and generates pixel resolution digital image information 728. To reiterate, using pixel size units as the minimum (or "atomic") positioning unit produces what is called "pixel precision" since the position values are accurate to the size of one (1) pixel.

Rounding position values for line drawings to pixel precision introduces changes, or errors, into displayed images. Each of these errors may be up to ½ a pixel in size (assuming that values less than ½ a pixel are rounded down and values greater than or equal to ½ a pixel are rounded up). Thus, the overall width of a line section may be less precise than desired since the width or weight of the line is (may be) rounded.

§ 1.2.4 Rendering Graphics

Similar to text and line drawings, certain graphics, represented analytically or by a resolution higher than that of a display device 650, may have to be scaled and rounded to correspond to the resolution of the display device 650. Referring to FIG. 7, this may be done by a scaling process 710 which accepts ultra resolution digital image information 704 and generates pixel resolution digital image information. Thus, rounding errors can be introduced here as well.

§ 1.2.5 Unmet Needs

In view of the errors introduced when rounding character values, line drawings, or high resolution or analytic graphics to pixel precision as introduced above, methods and apparatus to improve character spacing and positioning, to increase the legibility and perceived quality of text, to improve the resolution of line drawings, and/or to improve the resolution of images are needed. Such methods and apparatus should not blur the image, as occurs when standard anti-aliasing is used.

§ 2. SUMMARY OF THE INVENTION

The present invention improves the resolution of images (either analog images, analytic images, or images having a higher resolution than that of a display device) to be rendered on patterned displays. In one aspect of the present invention, an overscaling or oversampling process may accept analytic character information, such as contours for example, and a scale factor or grid and overscale or oversample the analytic character information to produce an overscaled or oversampled image. The overscaled or oversampled image generated has a higher resolution than the display upon which the character is to be rendered. If, for example, the display is a RGB striped LCD monitor, the ultra-resolution image may have a resolution corresponding to the sub-pixel component resolution of the display, or an integer multiple thereof. For example, if a vertically striped RGB LCD monitor is to be used, the ultra-resolution image may have a pixel resolution in the Y direction and a ⅓ (or ⅓N, where N is an integer) pixel resolution in the X direction. If, on the other hand, a horizontally striped RGB LCD monitor is to be used, the ultra-resolution image may have a pixel resolution in the X direction and a ⅓ (or ⅓N) pixel resolution in the Y direction. Then a process for combining displaced samples of the ultra-resolution image may be used to generate another ultra-resolution image (or an image with sub-pixel information) which is then cached. The cached character information may then be accessed by a compositing process which uses foreground and background color information.

An analytic image, such as a line drawing for example, may be applied to the oversampling/overscaling process as was the case with the character analytic image. However, since the analytic image may have different units than that of the character analytic image, the scale factor applied may be different. In any event, the downstream processes may be similarly applied.

Since an ultra resolution image is already "digitized", that is, not merely mathematically expressed contours or lines between points, it may be applied directly to a process for combining displaced samples of the ultra-resolution image to generate another ultra-resolution image (or an image with sub-pixel information). Downstream processing may then be similarly applied.

In one embodiment of the present invention, the functionality of the overscaling/oversampling process and the processes for combining displaced samples may be combined into a single step analytic to digital sub-pixel resolution conversion process.

§ 3. BRIEF DESCRIPTION OF THE DRAWINGS

§4. DETAILED DESCRIPTION

The present invention concerns novel methods, apparatus and data structures for rendering text, line art and graphics on displays having sub-pixel components. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown.

Functions which may be performed by the present invention are introduced in § 4.1 below. Then, exemplary environments in which the present invention may operate are then described in § 4.2 below. Thereafter, exemplary embodiments, methods, and data structures which may be used to effect various aspects of the present invention are described in § 4.3 below. Finally, conclusions about the present invention are presented in § 4.4 below.

§ 4.1 Functions which may be Performed

Figure 8:
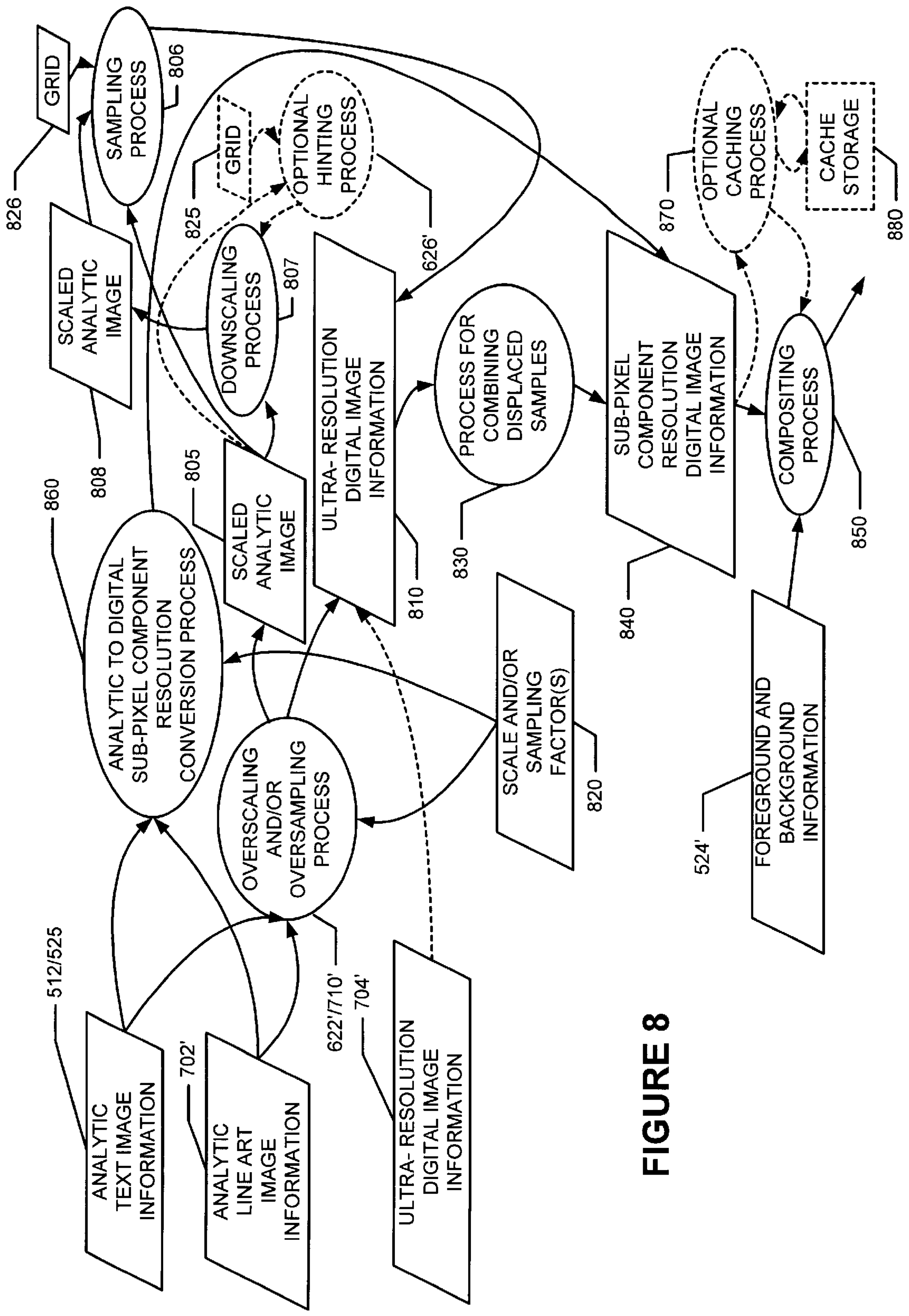
FIG. 8 illustrates processes that may be used to effect various aspects of the present invention.

FIG. 8 is a high level diagram of processes that may be performed to effect various aspects of the present invention, as well as data accepted by or generated by such processes. As shown, the processes may act on an analytic image 512/525, such as contours, foreground and background colors of a character; an analytic image information 702', such as lines, points, contours, foreground and background colors of line art; or an image 704' having a higher resolution than that of the display 560 (also referred to as an "ultra-resolution image"). Processes associated with rendering a character image 512/525 are addressed in § 4.1.1 below. Processes associated with rendering a non-character analytic image 702' are addressed in § 4.1.2 below. Processes associated with rendering an ultra-resolution image 704' are addressed in § 4.1.3 below.

§ 4.1.1 Processes Associated with Rendering Character Images

An overscaling or oversampling process 622'/710' may accept analytic character information, such as contours for example, and a scale factor or grid 820 and overscale and/or oversample the analytic character information. In this context, given an analytic character outline arranged on a grid defined by a coordinate system, overscaling means stretching the analytic character outline while leaving the coordinate system unchanged, while oversampling means compressing the grid defined by the coordinate system while leaving the analytic character outline unchanged. In the first case, in which the analytic character outline is overscaled, an overscaled analytic image 805 is generated. The overscaled analytic image 805 may then be sampled by sampling process 806 to generate ultra-resolution digital image information 810. In the second case, in which the analytic character outline (which may have been overscaled) is oversampled, the ultra-resolution digital image information 810 is generated directly. The ultra-resolution image 810 has a higher resolution than the display 560 upon which the character is to be rendered. In one example, if the display is a RGB striped LCD monitor for example, the ultra-resolution image may have a resolution corresponding to the sub-pixel component resolution of the display, or an integer multiple thereof. For example, if a vertically striped RGB LCD monitor is to be used, the ultra-resolution image 810 may have a pixel resolution in the Y direction and a ⅓ (or ⅓N, where N is an integer) pixel resolution in the X direction. If, on the other hand, a horizontally striped RGB LCD monitor is to be used, the ultra-resolution image 810 may have a pixel resolution in the X direction and a ⅓ (or ⅓N) pixel resolution in the Y direction.

The optional hinting process 626' may apply hinting instructions to the overscaled analytic image 805. In one embodiment, the overscaling and/or oversampling process 622'/710' overscales the analytic image 515/525 by a factor of an arbitrarily large number N (e.g., N=sixteen (16)) in the X direction and does not scale the analytic image 515/525 in the Y direction. By doing this, in many cases, the hinting instructions of the optional hinting process 626' will not cause problems in the X direction, which might otherwise occur. In this embodiment, the downscaling process 807 scales the hinted image by Z/N, where Z is the number of samples per pixel element desired (e.g., Z/N=6/16). The resulting scaled analytic image 808 may then be sampled by the sampling process 806 to generate the ultra-resolution image 810. Consequently, the resulting ultra-resolution digital image information 810 is overscaled by Z (e.g., six (6)) in the X direction. Naturally, in alternative embodiments, the scaled analytic image 805 may be directly sampled by the sampling process 806 to generate an ultra-resolution image 810.

Figure 9:
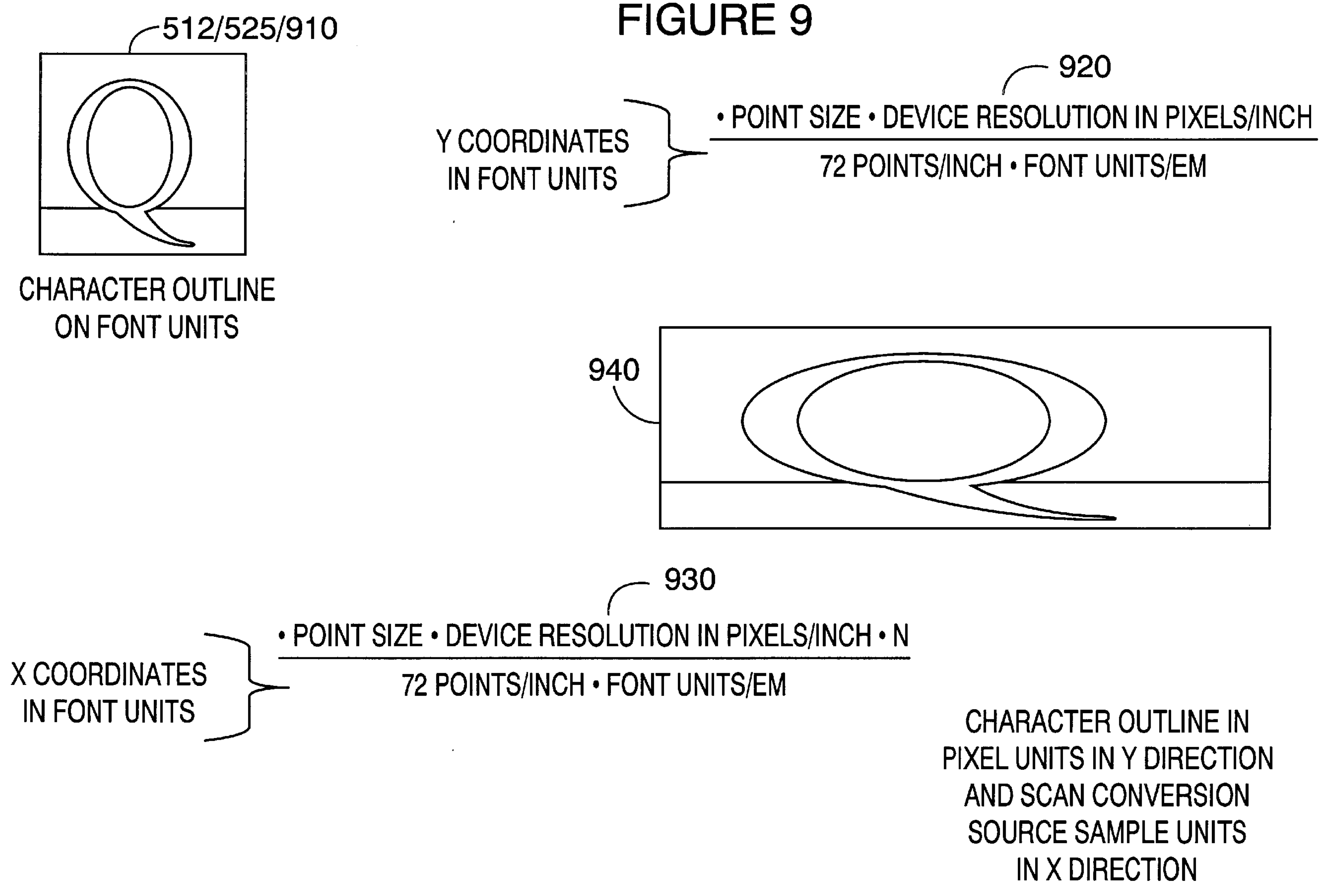
FIG. 9 illustrates an overscaling process operating on character outline information.

FIG. 9 illustrates an example of the operation of an exemplary overscaling/oversampling process 622'/710' used in the case of a vertically striped LCD monitor. First, font vector graphics (e.g., the character outline), point size and display resolution are accepted. This information is denoted 512/525/910 in FIG. 9. The font vector graphics (e.g., the character outline) 512/525/910 is rasterized based on the point size, display resolution and the overscale factors (or oversample rate). As shown in the example of FIG. 9, the Y coordinate values of the character outline (in units of font units) are scaled as shown in 920 and rounded to the nearest integer pixel value. On the other hand, the X coordinate values of the character outline (in units of font units) are overscaled as shown in 930 and rounded to the nearest integer scan conversion source sample (e.g., pixel sub-component) value. The resulting data 940 is the character outline in units of pixels in the Y direction and units of scan conversion source samples (e.g., pixel sub-components) in the X direction.

Then, referring back to FIG. 8, a process 830 for combining displaced (e.g., adjacent, spaced, or overlapping) samples of the ultra-resolution image 624' can be used to generate another ultra-resolution image 840 (or an image with sub-pixel information) which may then be cached into cache storage 880 by the optional caching process 870. Each sample of the ultra-resolution image 840 may be based on the same number or differing numbers of samples from the ultra-resolution image 810. The cached character information 870 may then be accessed by a compositing process 850 which uses the foreground and background color information 524'.

§ 4.1.2 Processes Associated with Processing Non-Character Analytic Images

The analytic image 702', such as a line drawing for example, may be applied to the oversampling/overscaling process 622'/710' as was the case with the character analytic image 512/525. However, since the analytic image 702' may have different units than that of the character analytic image 512/525, the scale factor 820 applied may be different. In any event, the downstream processes may be similarly applied.

§ 4.1.3 Processes Associated with Processing Ultra-Resolution Images

Since an ultra resolution image 704' is already "digitized", that is, not merely mathematically expressed contours or lines between points, it may be applied directly to the process 830 for combining displaced samples of the ultra-resolution image 810 to generate another ultra-resolution image 840 (or an image with sub-pixel information). Downstream processing may then be similarly applied.

§ 4.1.4 Alternative Processing of Analytic Images

As shown, the functionality of the overscaling/oversampling process 622'/710' and the processes 830 for combining displaced samples may be combined into a single step analytic to digital sub-pixel resolution conversion process 860.

Having introduced processes which may perform functions related to various aspects of the present invention, exemplary apparatus, methods and data structures which may be used to effect these processes are described in § 4.3 below. First, however, an exemplary environment in which the present invention may operate is introduced in § 4.2 below.

§ 4.2 Exemplary Environments in which the Invention may Operate

As alluded to above, the present invention may be used in the context of increasing the resolution of text to be rendered on a display, an analytic image, such as line art for example, to be rendered on a display, or ultra-resolution graphics to be rendered on a display.

Figure 1:
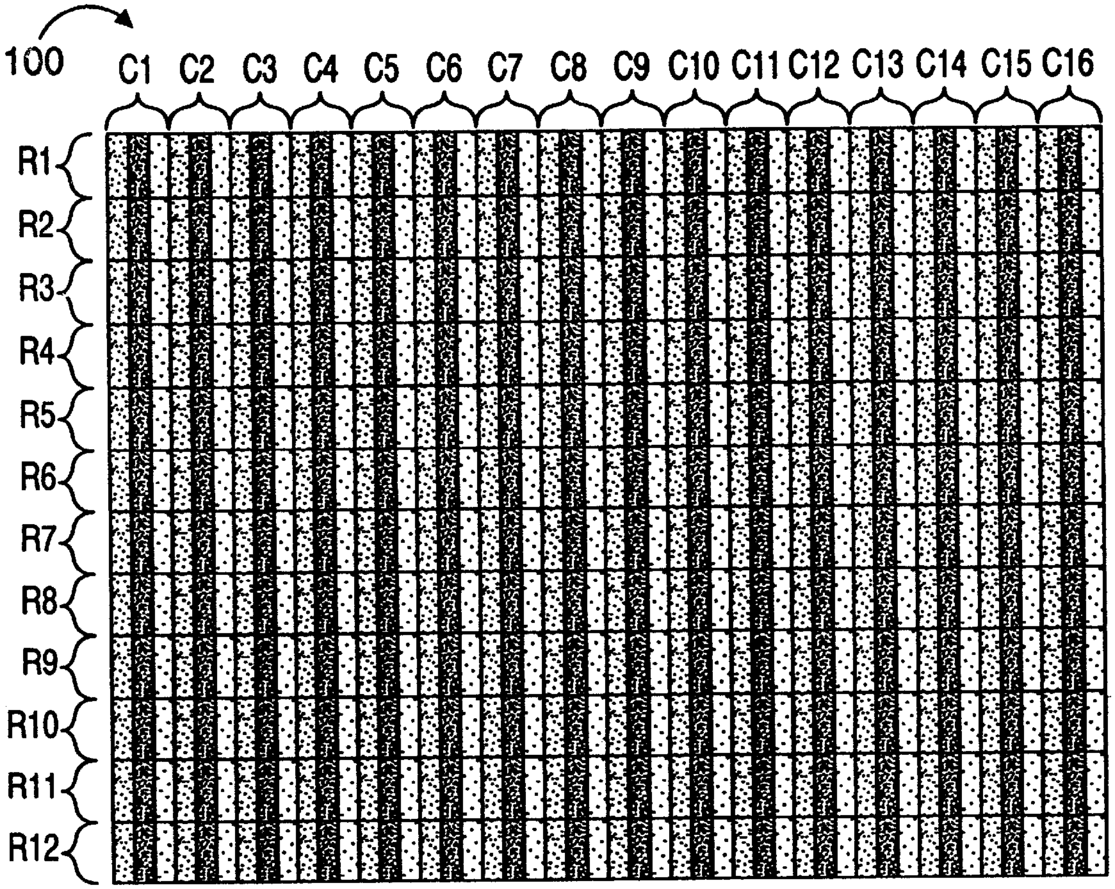
FIGURE 1 (Prior Art)
FIGS. 1 and 2 illustrate vertical striping in a conventional RGB LCD display device.
Figure 2:
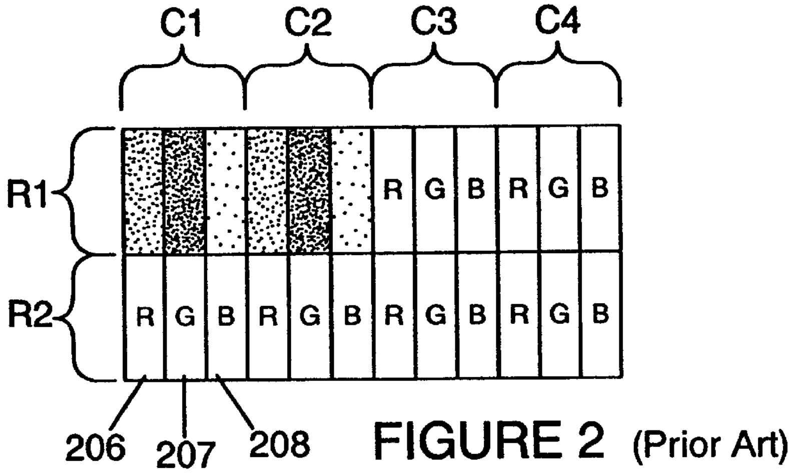
FIGURE 2 (Prior Art)
Figure 3:
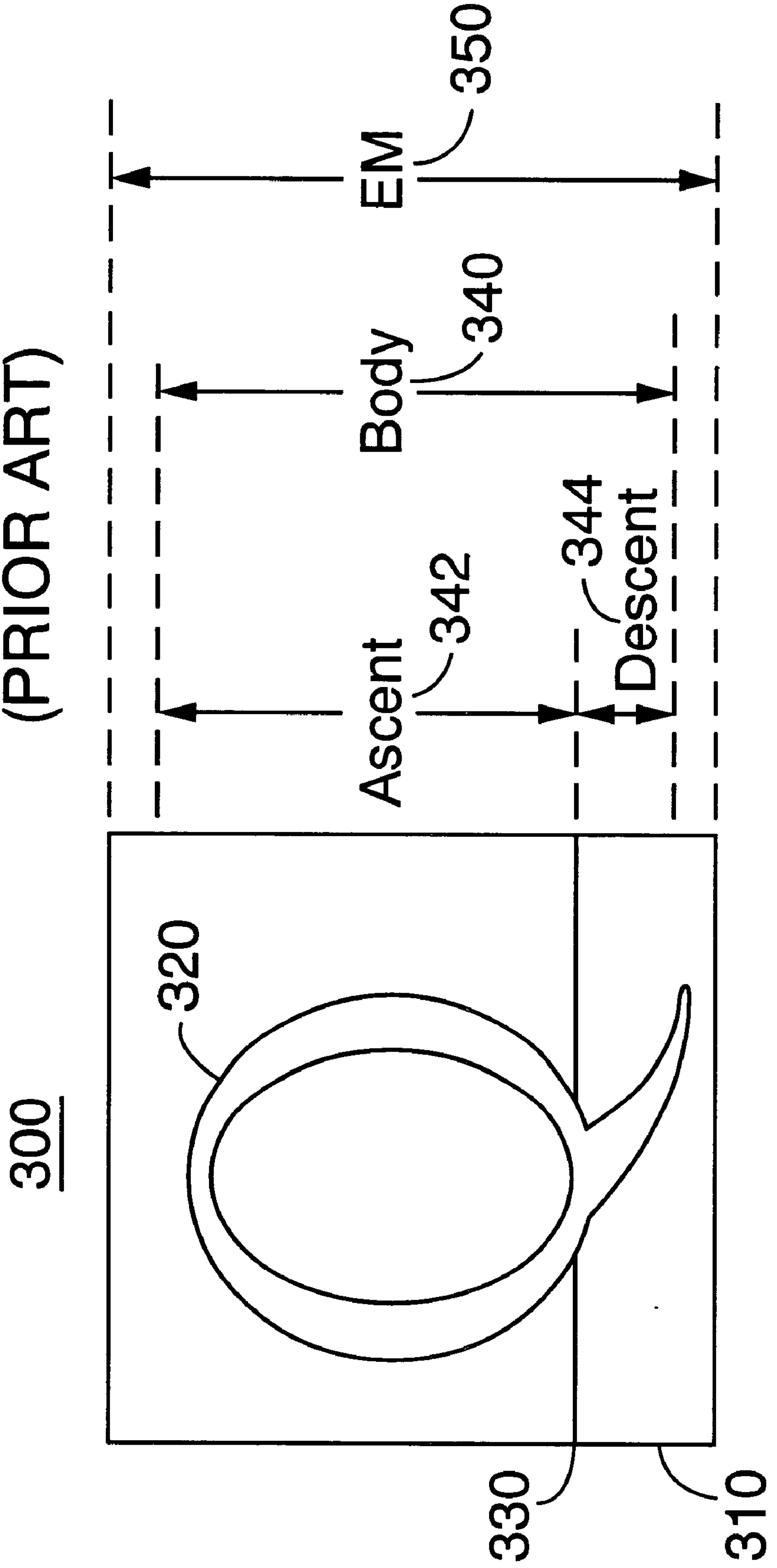
FIGURE 3 (PRIOR ART)
FIGS. 3 and 4 illustrate certain font technology terms.
Figure 4:
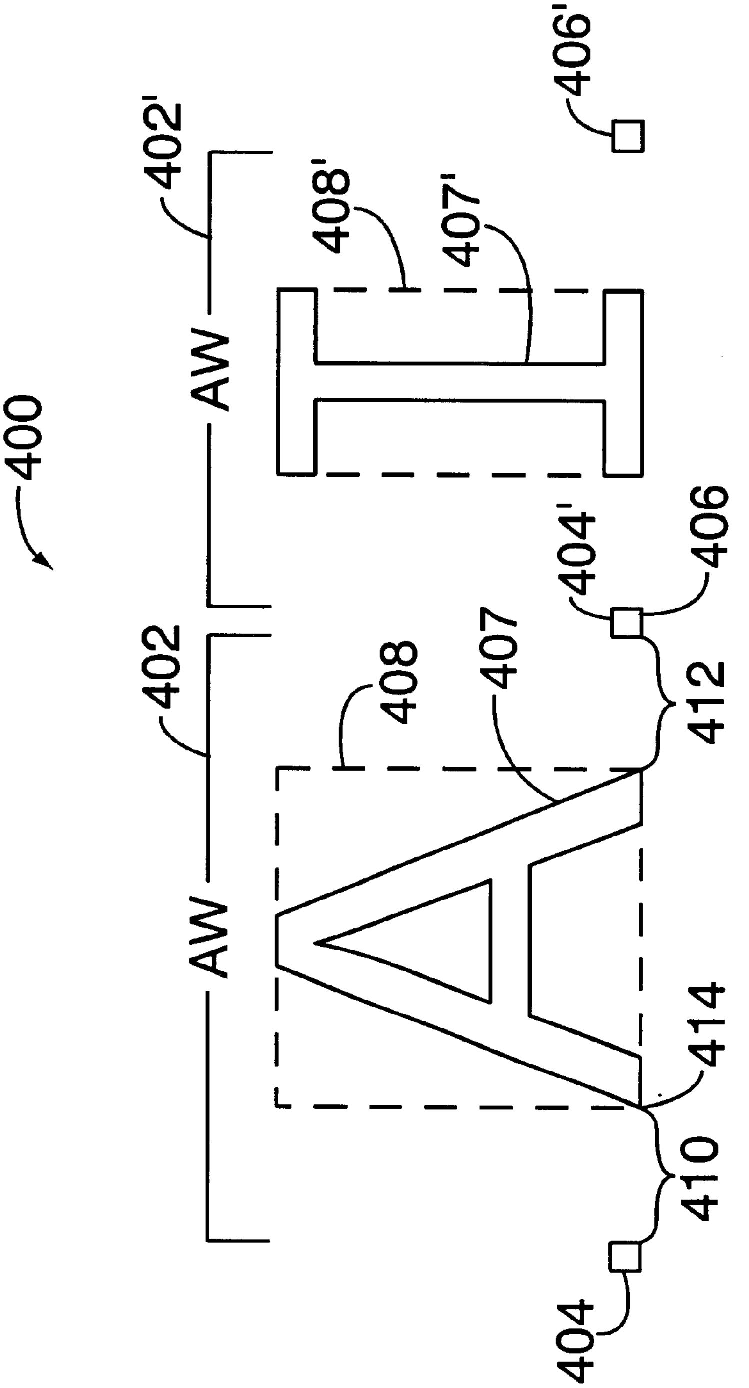
FIGURE 4 (PRIOR ART)
Figure 5:
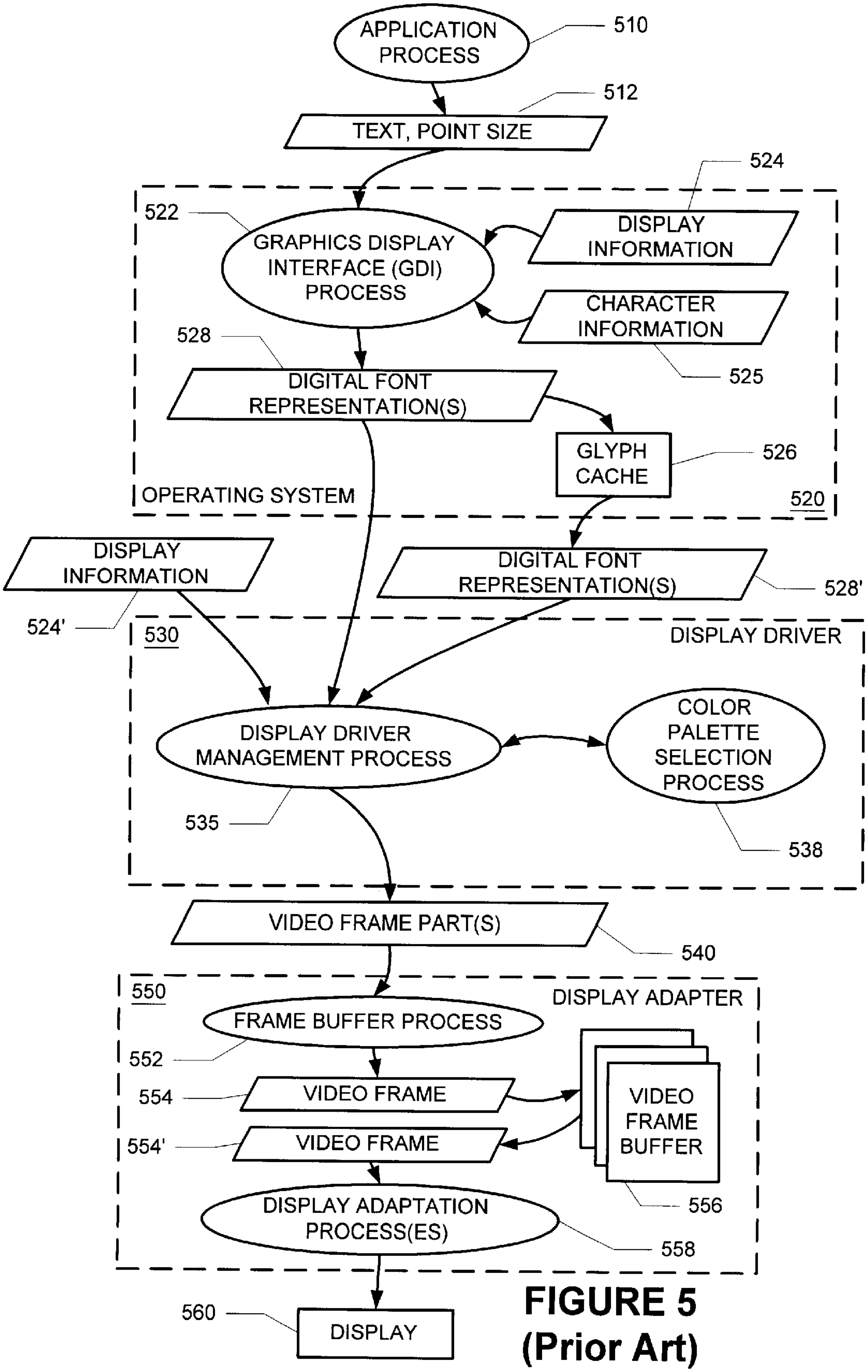
FIGURE 5 (Prior Art)
FIG. 5 illustrates processes that may be performed in a font or character rendering system in which the present invention may be implemented.
Figure 6:
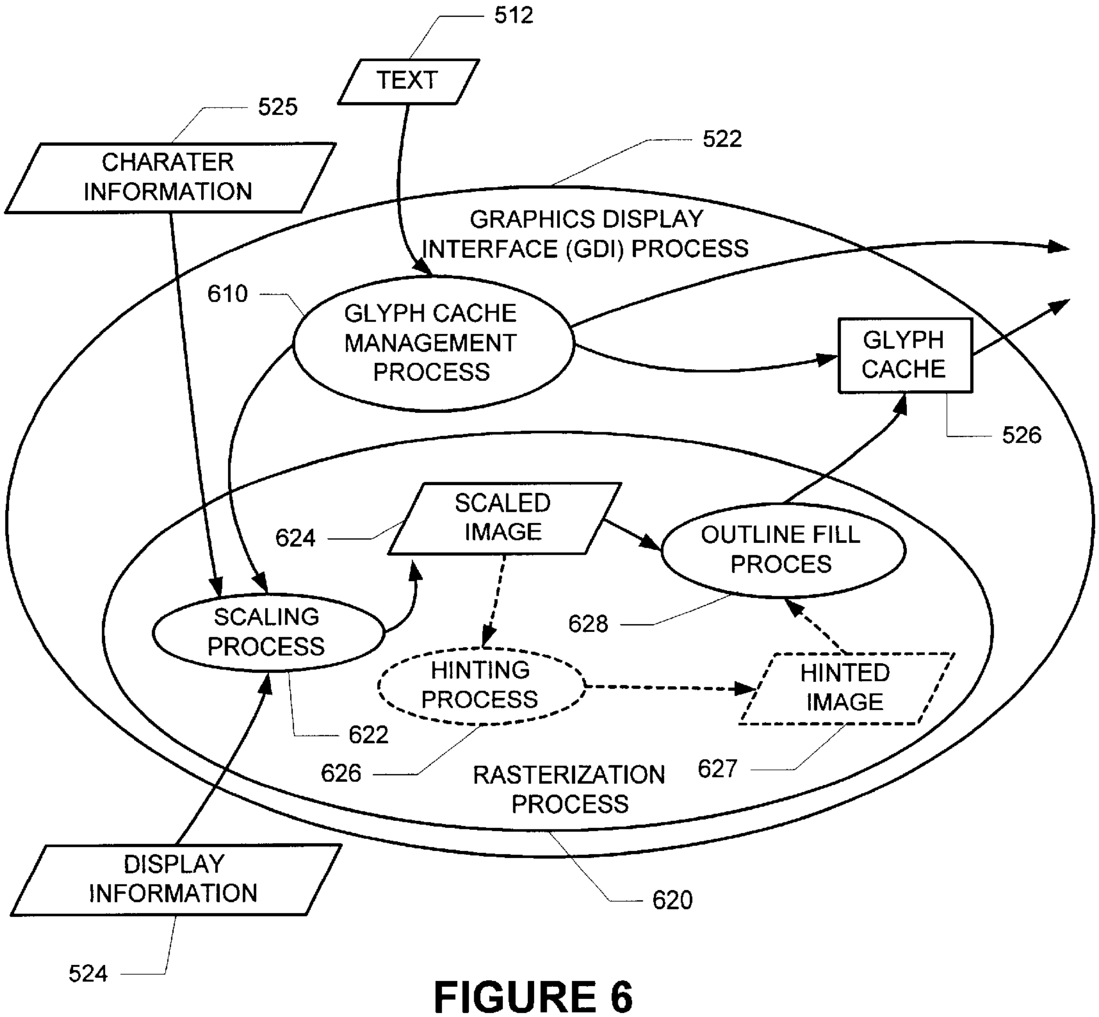
FIGURE 6 (Prior Art)
FIG. 6 illustrates processes that may be performed in a graphics display interface.

The techniques of the present invention may be applied to a known character rendering system such as that illustrated in FIG. 6 and described in § 1.2.2.2.1 above. The graphics display interface 522 would be modified. More specifically, the scaling process 622 and the outline fill process 628 would be replaced with the overscaling/oversampling process 622'/710', the downscaling process 807, the sampling process 806, and the process 830 for combining displaced samples of the present invention, or alternatively, replaced with the analog to digital sub-pixel conversion process 860 of the present invention. The techniques of the present invention may be similarly applied to a known analytic image rendering system. In some embodiments of the present invention, intermediate results, such as the results generated from a first filtering act of a two-part filtering technique, may be generated. The second filtering act of the two-part filtering technique may then be performed on such intermediate results. The final result of the second filtering act may then be cached. In such embodiments, the first filtering act of the two-part filtering technique may be performed by a font driver, while the second filtering act of the two-part filtering technique may then be performed by the graphics display interface (or "GDI") of the operating system.

Figure 7:
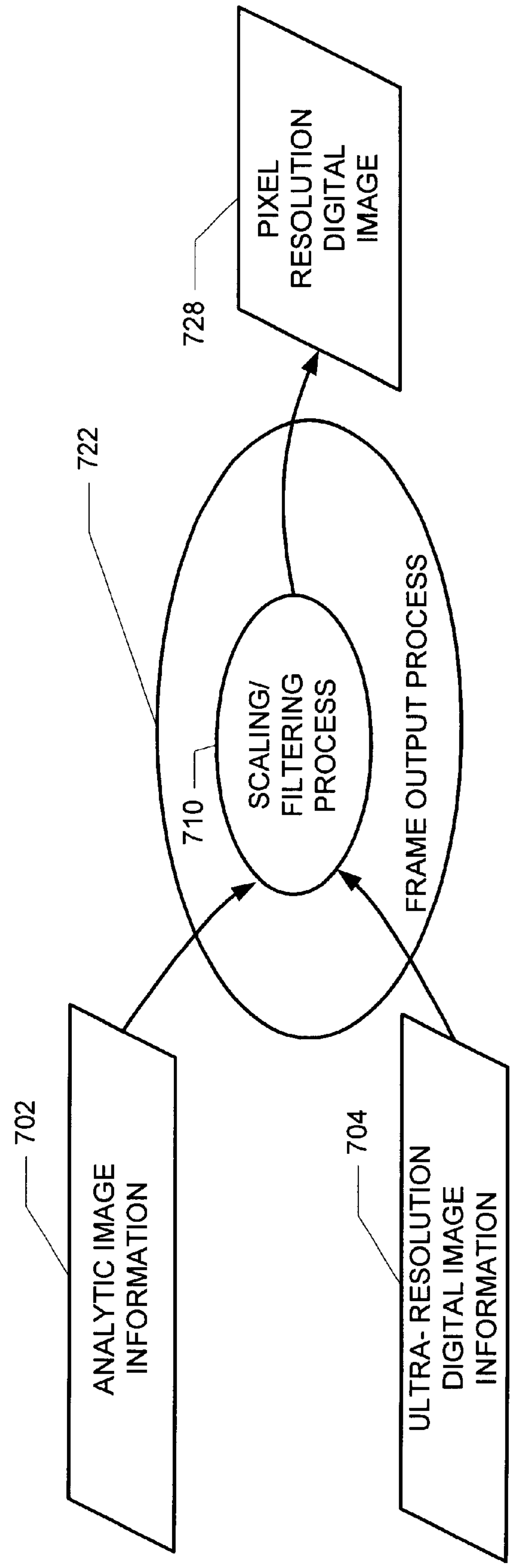
FIGURE 7 (Prior Art)
FIG. 7 illustrates processes that may be performed in a line art or graphics rendering system in which the present invention may be implemented.

Finally, techniques of the present invention may be applied to a known graphics rendered system such as that illustrated in FIG. 7 and described in §§ 1.2.3 and 1.2.4 above. The scaling process 710 would be replaced with a scaling process 622'/710' and a process 830 for combining displaced samples, or just a process 830 for combining displaced samples.

§ 4.3 Exemplary Embodiments, Methods, and Data Structures

Exemplary apparatus in which at least some aspects of the present invention may be implemented are disclosed in § 4.3.1 below. Then, exemplary methods for effecting processes of the present invention are disclosed in § 4.3.2.

§ 4.3.1 Exemplary Apparatus

Figure 10:
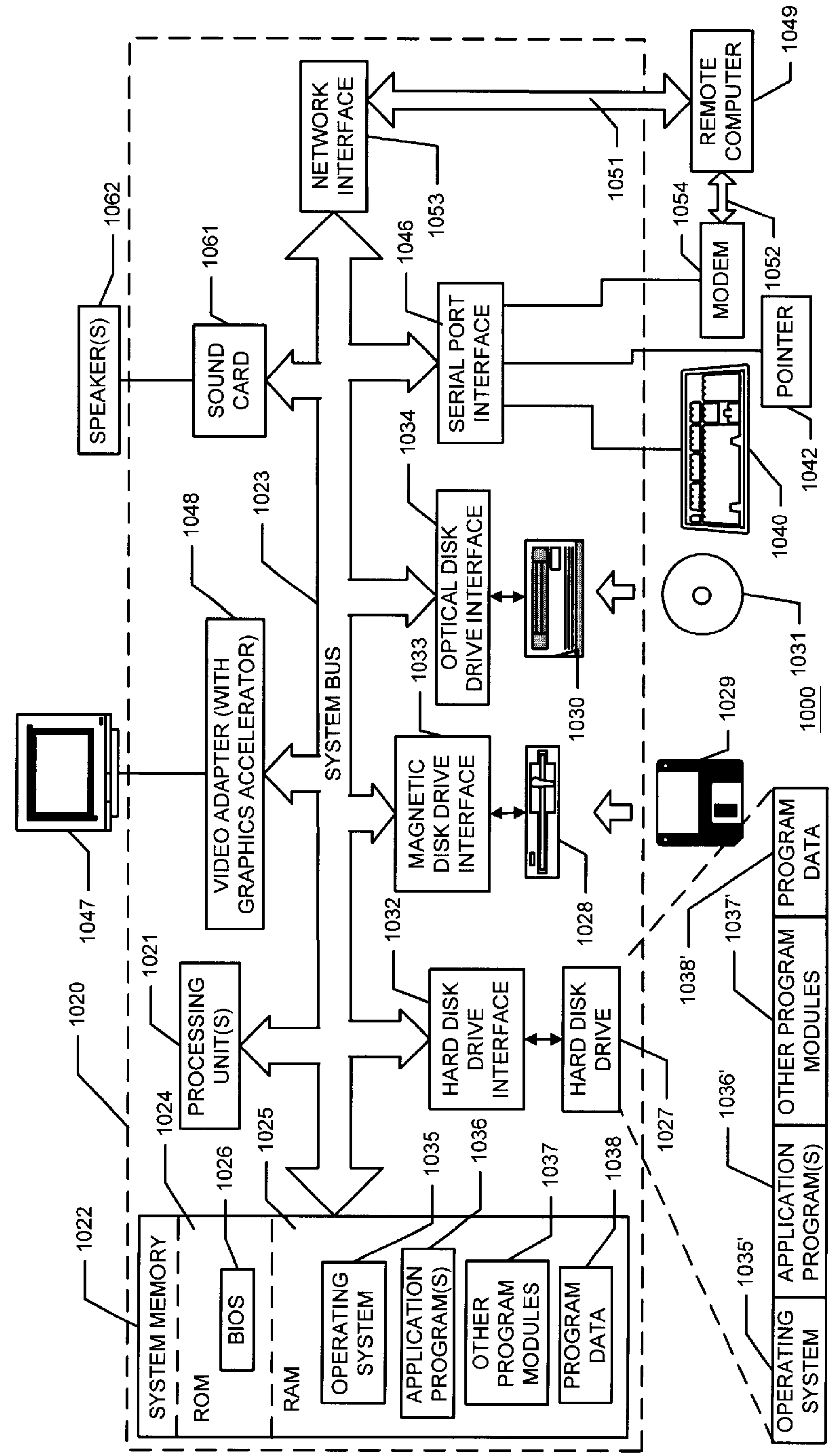
FIG. 10 is a block diagram of a computer architecture which may be used to implement various aspects of the present invention.
Figure 29:
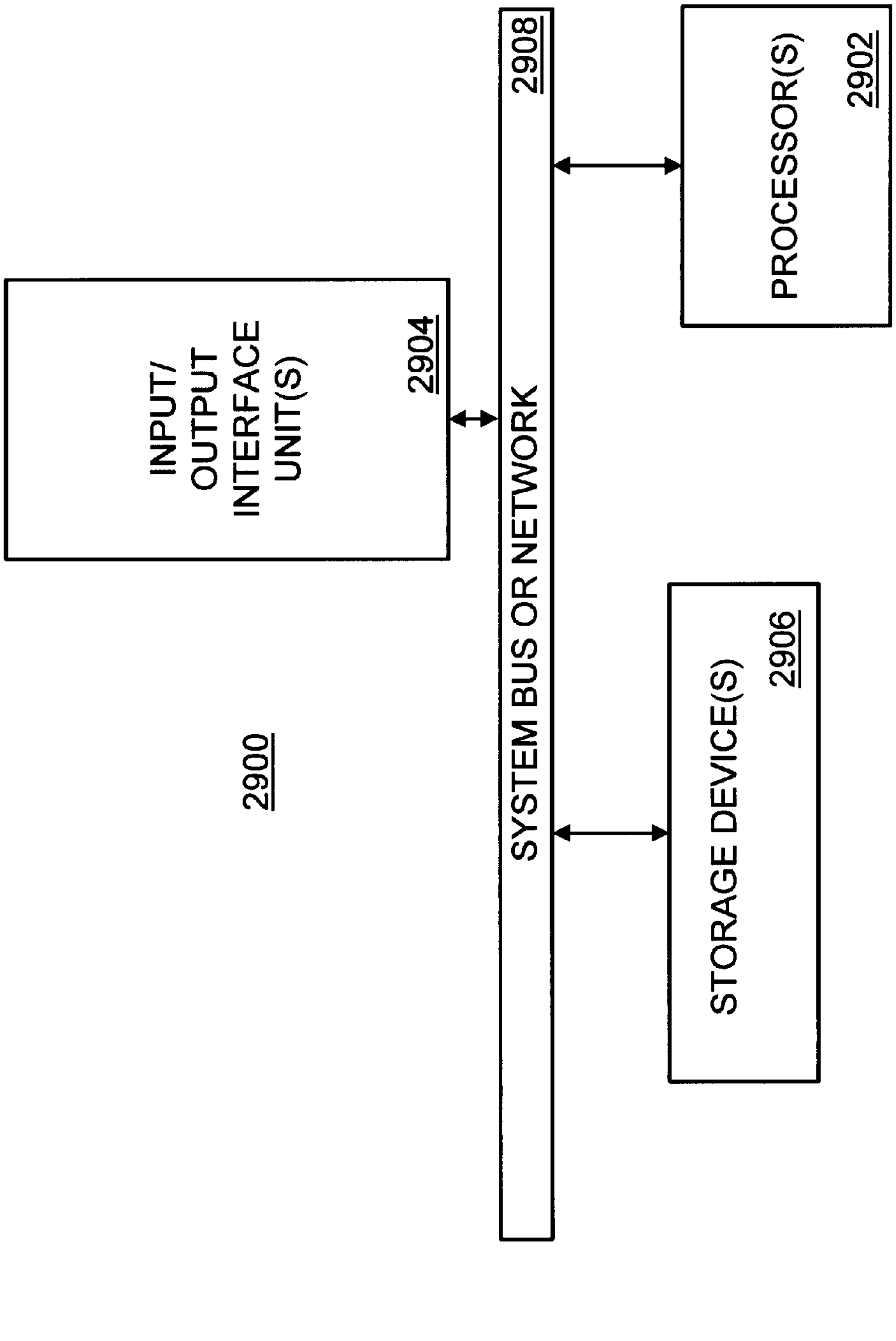
FIG. 29 is a high level block diagram of a machine which may be used to implement various aspects of the present invention.

FIGS. 10 and 29 and the following discussion provide a brief, general description of an exemplary apparatus in which at least some aspects of the present invention may be implemented. Various methods of the present invention will be described in the general context of computer-executable instructions, such as program modules and/or routines for example, being executed by a computing device such as a personal computer. Other aspects of the invention will be described in terms of physical hardware such as display device components and display screens for example.

Naturally, the methods of the present invention may be effected by apparatus other than those described. Program modules may include routines, programs, objects, components, data structures (e.g., look-up tables, etc.) that perform task(s) or implement particular abstract data types. Moreover, those skilled in the art will appreciate that at least some aspects of the present invention may be practiced with other configurations, including hand held devices, multiprocessor systems, microprocessor-based or programmable consumer electronics, network computers, minicomputers, set top boxes, mainframe computers, displays used in, e.g., automotive, aeronautical, industrial applications, and the like. At least some aspects of the present invention may also be practiced in distributed computing environments where tasks are performed by remote processing devices linked through a communications network. In a distributed computing environment, program modules may be located in local and/or remote memory storage devices.

FIG. 10 is a block diagram of an exemplary apparatus 1000 which may be used to implement at least some aspects of the present invention. A personal computer 1020 may include a processing unit 1021, a system memory 1022, and a system bus 1023 that couples various system components including the system memory 1022 to the processing unit 1021. The system bus 1023 may be any of several types of bus structures including a memory bus or memory controller, a peripheral bus, and a local bus using any of a variety of bus architectures. The system 1022 memory may include read only memory (ROM) 1024 and/or random access memory (RAM) 1025. A basic input/output system 1026 (BIOS), including basic routines that help to transfer information between elements within the personal computer 1020, such as during start-up, may be stored in ROM 1024. The personal computer 1020 may also include a hard disk drive 1027 for reading from and writing to a hard disk, (not shown), a magnetic disk drive 1028 for reading from or writing to a (e.g., removable) magnetic disk 1029, and an optical disk drive 1030 for reading from or writing to a removable (magneto) optical disk 1031 such as a compact disk or other (magneto) optical media. The hard disk drive 1027, magnetic disk drive 1028, and (magneto) optical disk drive 1030 may be coupled with the system bus 1023 by a hard disk drive interface 1032, a magnetic disk drive interface 1033, and a (magneto) optical drive interface 1034, respectively. The drives and their associated storage media provide nonvolatile storage of machine readable instructions, data structures, program modules and other data for the personal computer 1020. Although the exemplary environment described herein employs a hard disk, a removable magnetic disk 1029 and a removable optical disk 1031, those skilled in the art will appreciate that other types of storage media, such as magnetic cassettes, flash memory cards, digital video disks, Bernoulli cartridges, random access memories (RAMs), read only memories (ROM), and the like, may be used instead of, or in addition to, the storage devices introduced above.

A number of program modules may be stored on the hard disk 1023, magnetic disk 1029, (magneto) optical disk 1031, ROM 1024 or RAM 1025, such as an operating system 1035, one or more application programs 1036, other program modules 1037, display driver 530/1032, and/or program data 1038 for example. The RAM 1025 can also be used for storing data used in rendering images for display as will be discussed below. A user may enter commands and information into the personal computer 1020 through input devices, such as a keyboard 1040 and pointing device 1042 for example. Other input devices (not shown) such as a microphone, joystick, game pad, satellite dish, scanner, or the like may also be included. These and other input devices are often connected to the processing unit 1021 through a serial port interface 1046 coupled to the system bus. However, input devices may be connected by other interfaces, such as a parallel port, a game port or a universal serial bus (USB). A monitor 560/1047 or other type of display device may also be connected to the system bus 1023 via an interface, such as a display adapter 550/1048, for example. In addition to the monitor 560/1047, the personal computer 1020 may include other peripheral output devices (not shown), such as speakers and printers for example.

The personal computer 1020 may operate in a networked environment which defines logical connections to one or more remote computers, such as a remote computer 1049. The remote computer 1049 may be another personal computer, a server, a router, a network PC, a peer device or other common network node, and may include many or all of the elements described above relative to the personal computer 1020. The logical connections depicted in FIG. 10A include a local area network (LAN) 1051 and a wide area network (WAN) 1052 (such as an intranet and the Internet for example).

When used in a LAN, the personal computer 1020 may be connected to the LAN 1051 through a network interface adapter card (or "NIC") 1053. When used in a WAN, such as the Internet, the personal computer 1020 may include a modem 1054 or other means for establishing communications over the wide area network 1052. The modem 1054, which may be internal or external, may be connected to the system bus 1023 via the serial port interface 1046. In a networked environment, at least some of the program modules depicted relative to the personal computer 1020 may be stored in the remote memory storage device. The network connections shown are exemplary and other means of establishing a communications link between the computers may be used.

FIG. 29 is a more general machine 2900 which may effect at least some aspects of the present invention. The machine 2900 basically includes a processor(s) 2902, an input/output interface unit(s) 2904, a storage device(s) 2906, and a system bus or network 2908 for facilitating data and control communications among the coupled elements. The processor(s) 2902 may execute machine-executable instructions to effect one or more aspects of the present invention. At least a portion of the machine executable instructions and data structures may be stored (temporarily or more permanently) on the storage devices 2906 and/or may be received from an external source via an input interface unit 2904.

Having described exemplary apparatus which may be used to effect at least some aspects of the present invention, exemplary methods for effecting at least some of the processes discussed in § 4.1 above are described.

§ 4.3.2 Exemplary Methods

In each of the following exemplary methods, a one-part filtering act or a two-part filtering act is referenced. An example of applying a one-part filter and a two-part filter are described in § 4.3.3 below with reference to FIGS. 30 and 31. First, however, the exemplary methods are described below.

Figure 11:
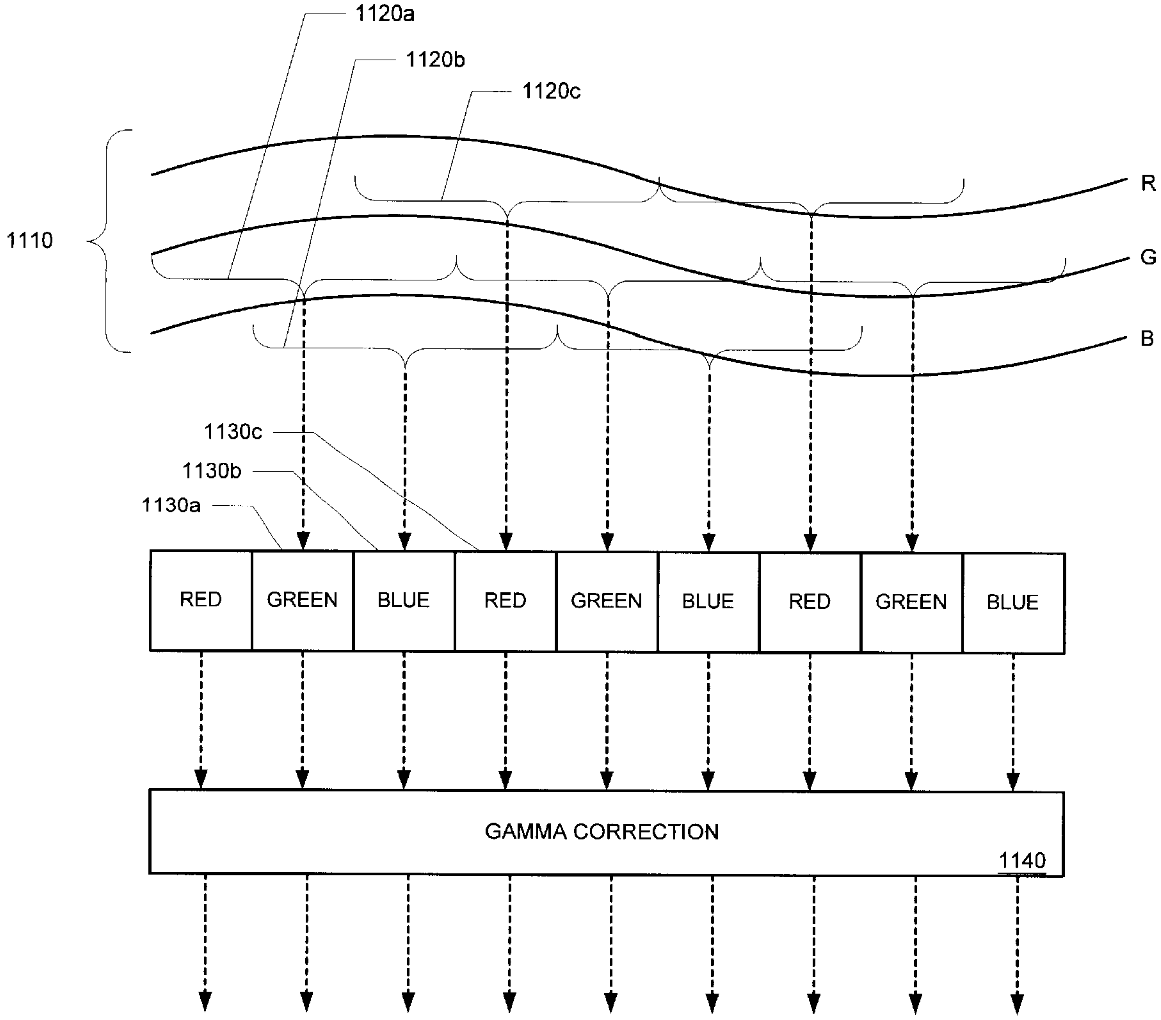
FIG. 11 illustrates the operation of an ideal analog to digital sub-pixel conversion method.
Figure 12:
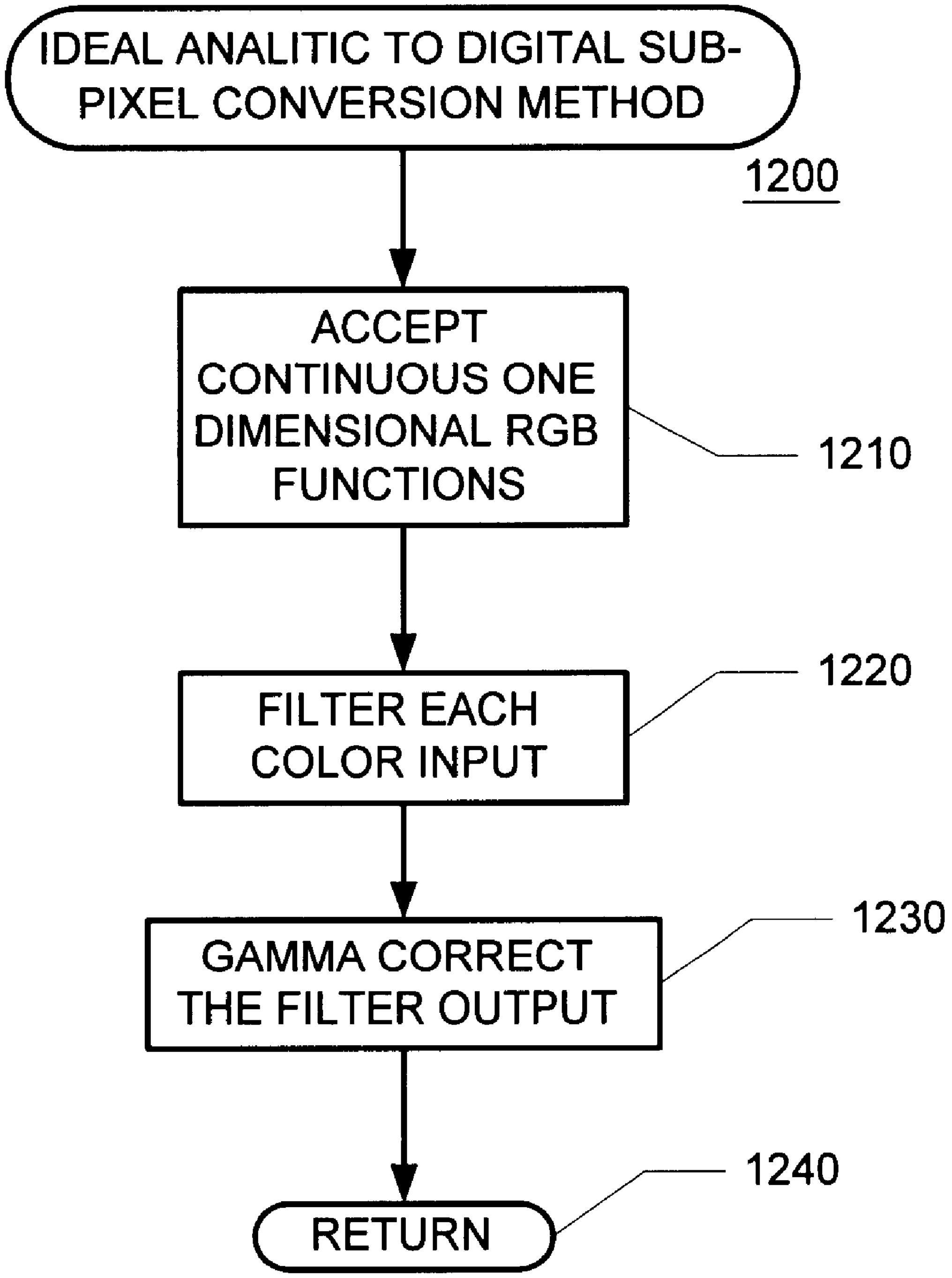
FIG. 12 is a high level flow diagram of that method.

FIG. 11 illustrates an operation of an exemplary resolution enhancement method 1200 which may be used to effect the analytic to digital sub-pixel conversion process 860. FIG. 12 is a flow diagram of this method 1200. Referring to both FIGS. 11 and 12, continuous one dimensional RGB functions (or functions of other color spaces) 1110 are accepted in act 1210. Each one of the color component inputs 1110 are then sampled (or filtered) as shown in act 1220. As shown by the brackets 1120 of FIG. 11, these filters 1120 may be a three-emitter (where an "emitter" is a sub-pixel component) wide box filter. Notice that the filters 1120 are spatially displaced from one another. The spatially displaced filters may be spaced, immediately adjacent, or partially overlapping. The output of each of the filters 1120 is a color value 1130 of an emitter. These values 1130 may be gamma corrected (or adjusted) based on a gamma (or other) response of the display 560 on which the image is to be rendered as shown in act 1230. The method 1200 is then left via RETURN node 1240.

The method 1200 is ideal in that there are no extra aliasing artifacts introduced. However, to effect the filters 1120, an integral over a continuous function 1110 is evaluated. This integration is possible when the input image 1110 is described analytically, but this is not always the case.

Figure 13:
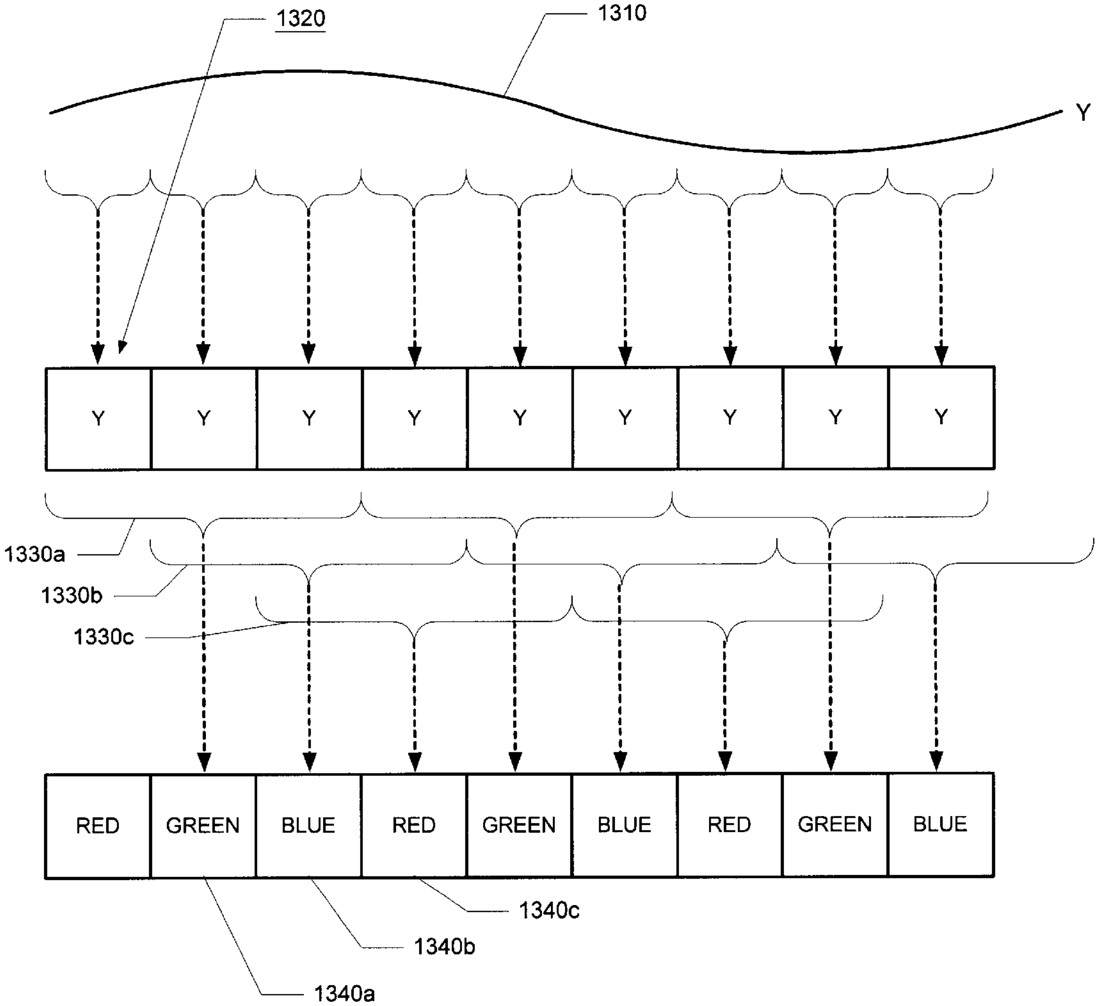
FIG. 13 illustrates the operation of a disfavored down-sampling method.
Figure 14:
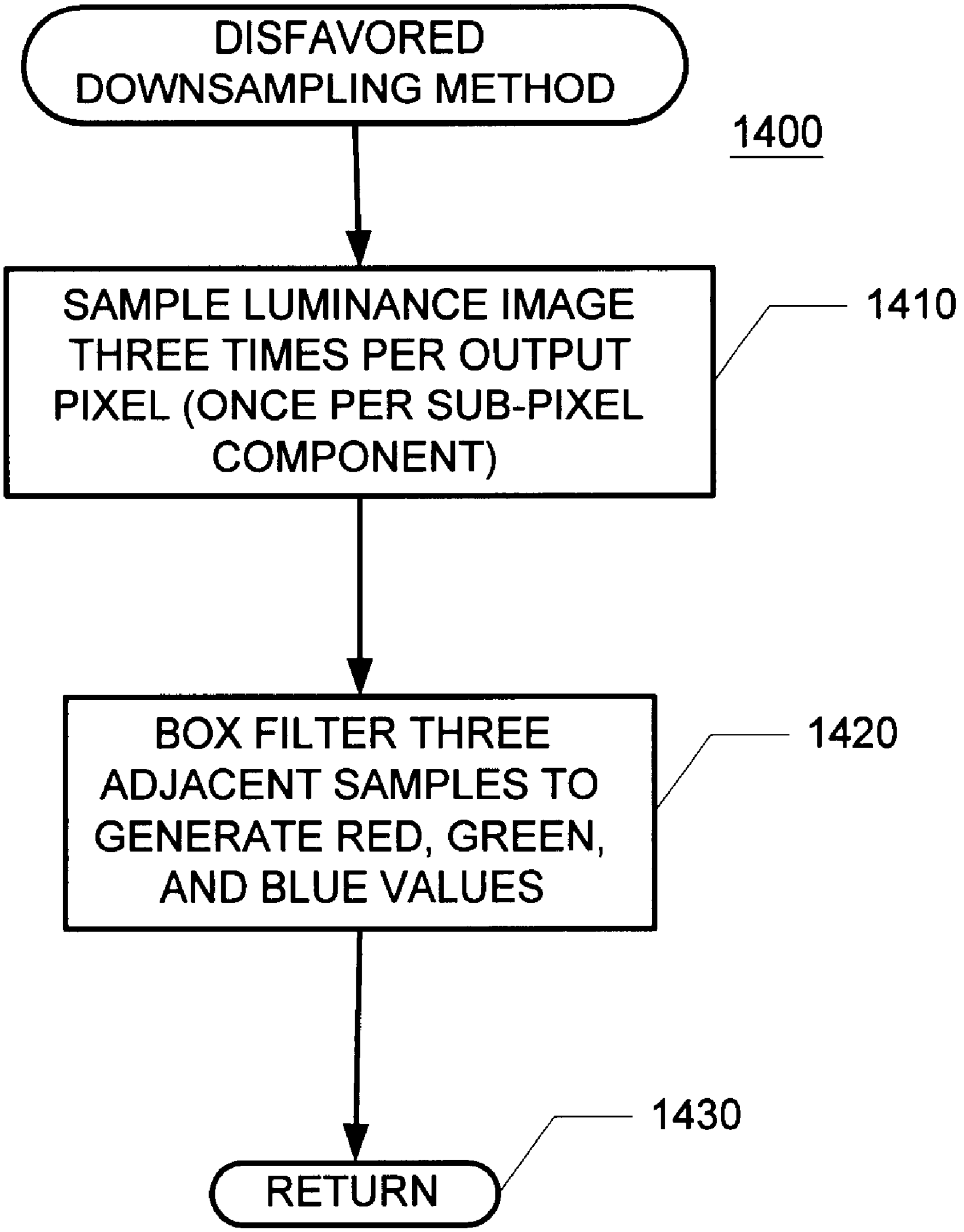
FIG. 14 is a high level flow diagram of that method.

FIG. 13 illustrates an operation of a disfavored exemplary resolution enhancement method 1400. FIG. 14 is a flow diagram of this method 1400. Referring to both FIGS. 13 and 14, a luminance image (Y) 1310 is sampled three (3) times per output pixel (which works out to once per sub-pixel component in a striped RGB monitor) as shown in act 1410. This sampling generates three luminance Y samples 1320 per pixel. Then, three adjacent samples are box filtered, that is averaged together (Note filters 1330 of FIG. 13.), to generate red, green and blue sub-pixel component values 1340, as shown in act 1420. The method 1400 is then left via RETURN node 1430.

Unfortunately, since this method 1400 only samples three (3) times per pixel, it produces aliasing artifacts. More specifically, sampling at a particular frequency "folds" frequencies above the Nyquist rate down to frequencies below the Nyquist rate. In this method 1400, frequencies above 3/2 cycles per pixel are folded down to frequencies below that rate. In particular, sampling three (3) times per output pixel causes input frequencies of two (2) cycles per pixel to be aliased down to one (1) cycle per pixel which causes unwanted color fringing. Also, the method 1400 does not generalize correctly to full color images since it operates on luminance (Y) only. Further, device response (e.g., gamma) correction is not effected.

Figure 15:
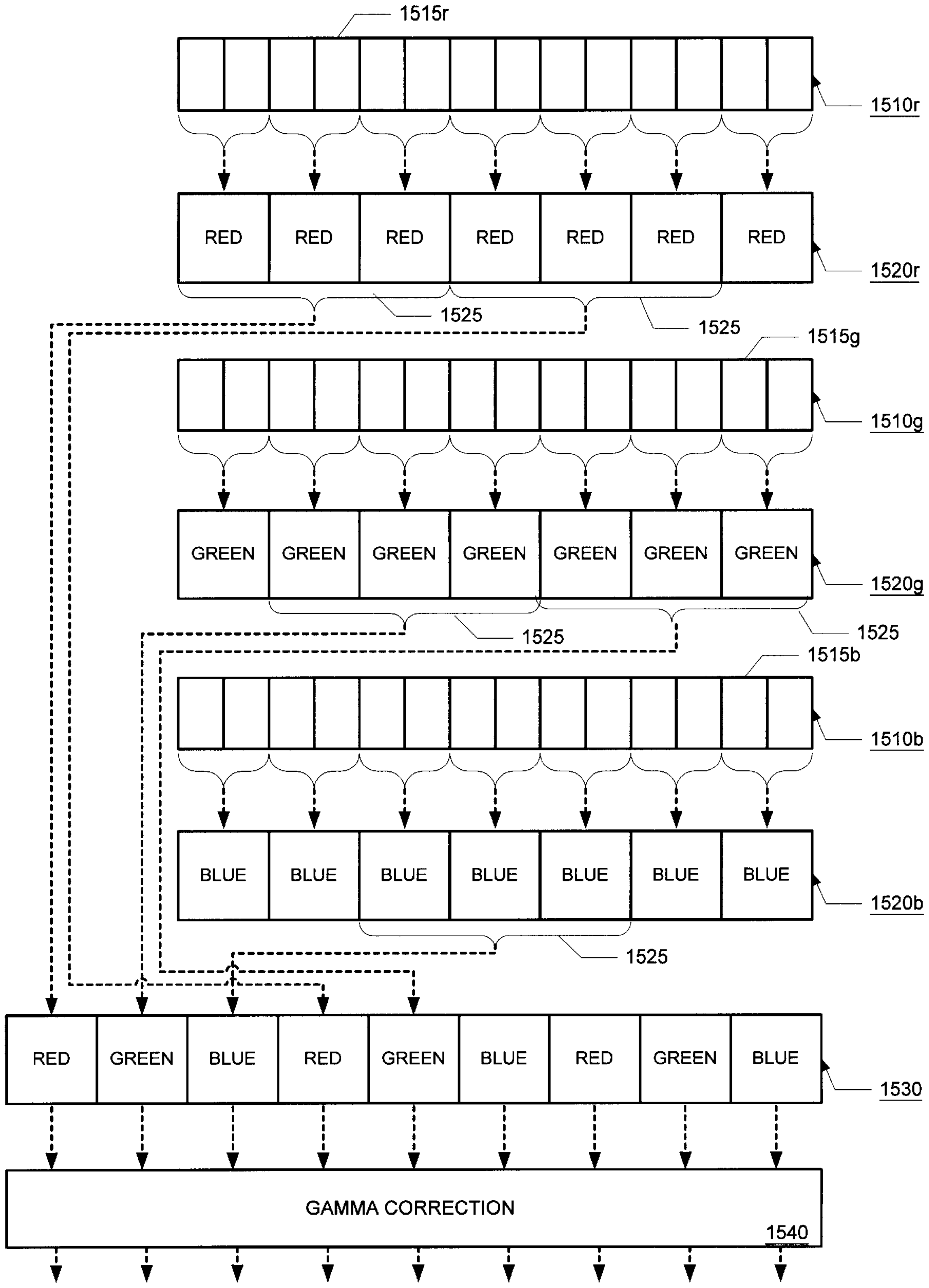
FIG. 15 illustrates the operation of a method for deriving sub-pixel element information from color scan lines.
Figure 16:
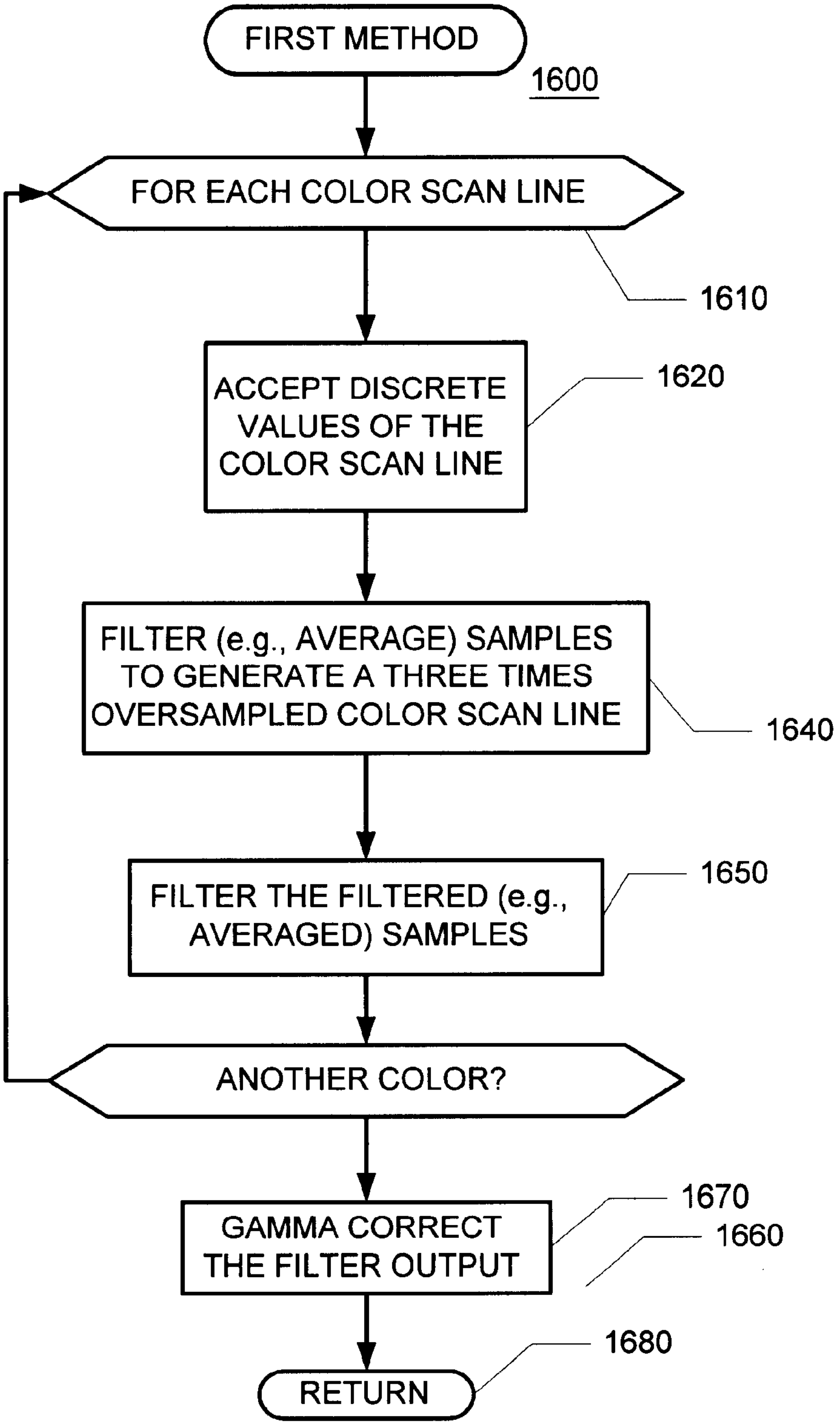
FIG. 16 is a high level flow diagram of that method.

FIG. 15 illustrates an operation of an exemplary resolution enhancement method 1600. This method 1600 may be used to effect the process 830 for combining displaced samples. FIG. 16 is a flow diagram of this method 1600. Referring to both FIGS. 15 and 16, the following loop of acts is performed for each color scan line 1510 as defined by 1610 and 1660. First, discrete values of the color scan line 1510 are accepted as shown in act 1620. The scanline 1510 of the associated color being processed comprises N samples per emitter (which may be 3N per pixel in an RGB striped monitor). As shown in FIG. 15, the scan lines 1510 contain N=2 samples per emitter. Then, the samples 1515 are filtered (e.g., averaged) to generate new samples of a three (3) times oversampled color scan line 1520 as shown in act 1640. Then, as shown in act 1650, the new samples 1520 are filtered again, for example with box filters shown as brackets 1525, to generate color values 1530 associated with sub-pixel components. In the illustrated embodiment, the filters (e.g., box filters) 1525 are centered at locations that correspond to the centers of the sub-pixel elements. Thus, notice that the filters 1525 are offset, and consequently operate at distinct positions within the image, for each of the color components as shown. The offset of the filters 1525 such that they operate at distinct positions within the image distinguishes the present invention over standard anti-aliasing techniques. Each of the filters 1525 may also have distinct filter weighting coefficients, which further distinguishes the present invention over standard anti-aliasing techniques. These acts are repeated if there are any further colors to be processed as shown by loop 1610–1660. Once all of the colors are processed, the filter output may be gamma corrected (or adjusted) based on the gamma (or other) response of the display 560 on which the image is to be rendered as shown in act 1670. The process 1600 is left via RETURN node 1680.

As shown in FIG. 15, the separate colors may be processed in parallel rather than in a sequence of loops as depicted in the method 1600 of FIG. 16.

The number of samples per emitter N may be two (2). This minimizes extra aliasing artifacts. As N increases, the computational load for filtering increases. For N=2, frequencies that are five (5) cycles per pixel get aliased into one (1) cycle per pixel. However, the frequency spectrum of edges tend to go as 1/f, so that using N=2 sampling should yield about 2.5 times less color fringing due to aliasing than N=1. Setting the samples per emitter N to be greater than two (2) yields even less aliasing, but, as stated above, adds computational complexity. Further, the output of the N=2 filters require less precision to store exactly, and therefore consume less memory and may be faster due to decreased memory bandwidth requirements. For example, for a patterned display device have three color emitters per pixel, if $N \geqq 3$, more than one byte per pixel may be needed to store the character information.

Figure 17:
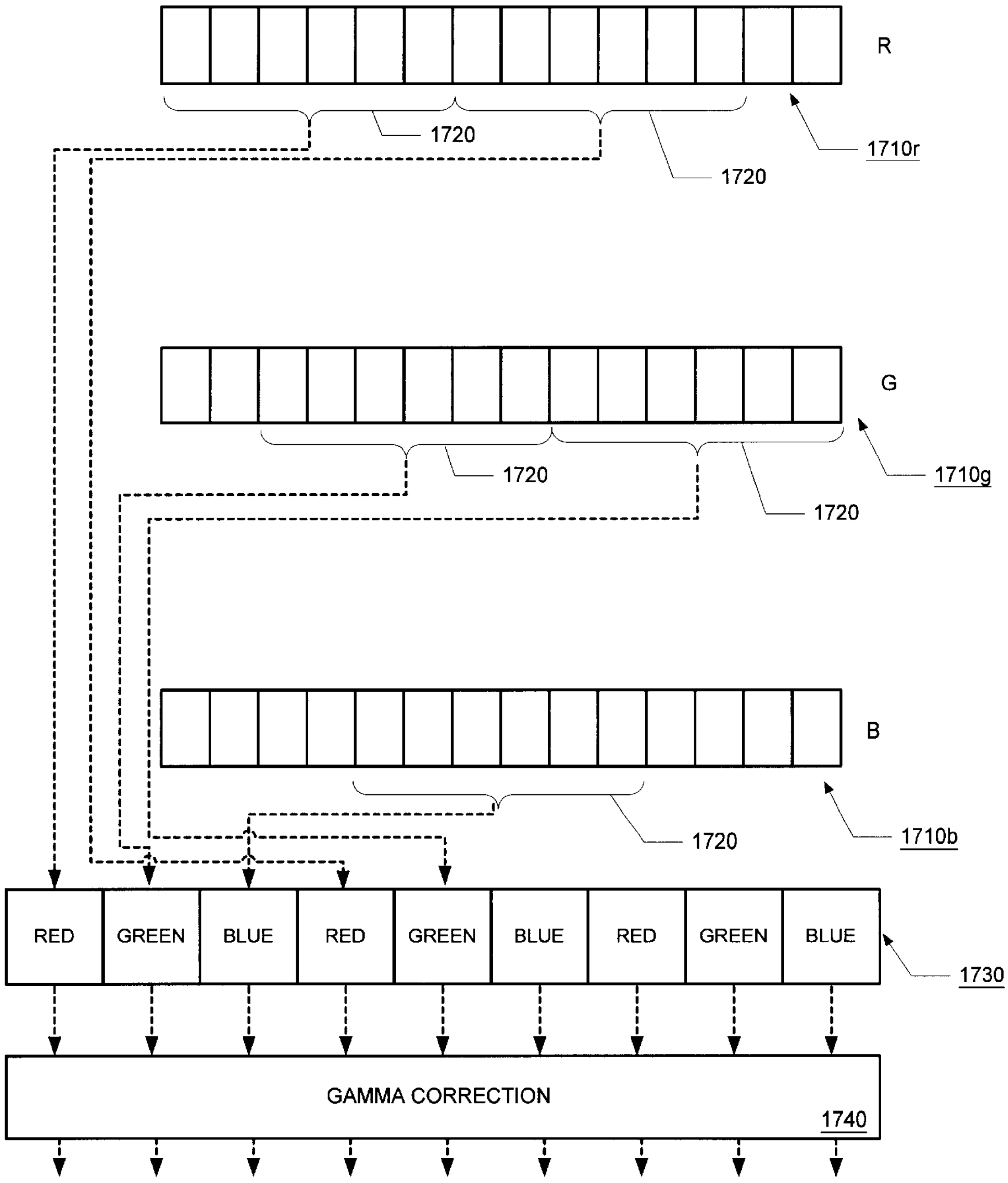
FIG. 17 illustrates the operation of an alternative method for deriving sub-pixel element information from color scan lines.
Figure 18:
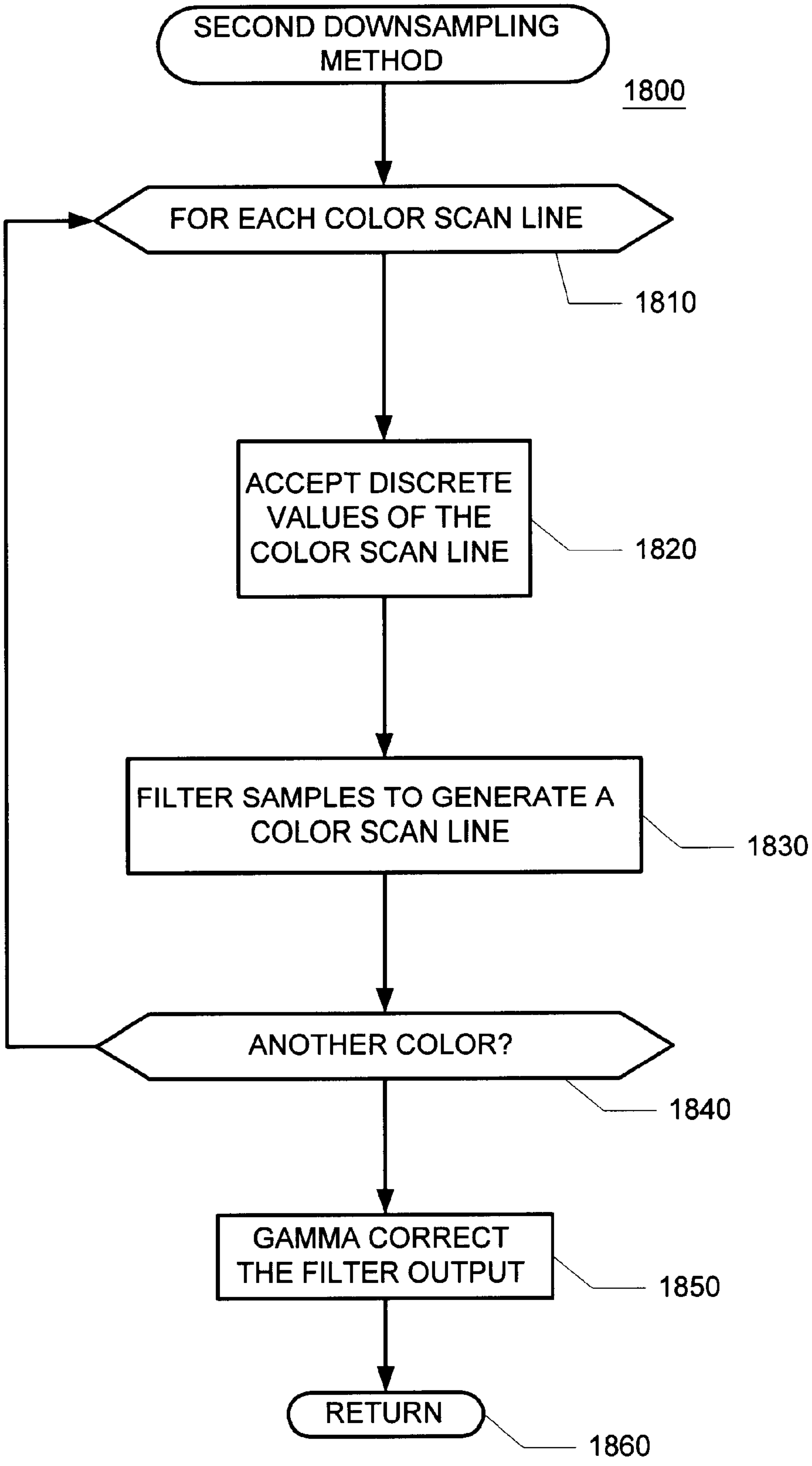
FIG. 18 is a high level flow diagram of that method.

FIG. 17 illustrates an operation of an exemplary resolution enhancement method 1800. This method 1800 may be used to effect the process 830 for combining displaced samples. FIG. 18 is a flow diagram of this method 1800. The method 1800 of FIG. 18 is similar to that method 1600 of FIG. 16. However, the per-emitter pre-filtering (1640) and the filtering (1650) are combined into one filter. This is possible since both operations are linear.

Referring now to both FIGS. 17 and 18, the following loop of acts is performed for each color scan line 1710 as defined by acts 1810 and 1840. First, discrete values of the color scan line 1710 are accepted as shown in act 1820. The scan line 1710 of the associated color being processed is then filtered, in one step, to generate a color scan line as shown in act 1830. As shown, a filter (e.g., a box filter) 1720 may be applied to a six-times oversampled (N=2) scanline for each color. The filter 1720 may be centered at the sub-pixel element location. Thus, notice that the filters 1720 are offset, and consequently operate at distinct positions within the image, for each of the color components as shown. The offset of the filters 1720 such that they operate at distinct positions within the image distinguishes the present invention over standard anti-aliasing techniques. Naturally, other filters can be used and other values of N can be used. These acts are repeated if there are any further colors to be processed as shown by loop 1810–1840. Once all of the colors are processed, the filter output may be gamma corrected (or adjusted) based on the gamma (or other) response of the display 560 on which the image is to be rendered as shown in act 1850. The process 1800 is then left via RETURN node 1860.

As shown in FIG. 17, the separate colors may be processed in parallel rather than in a sequence of loops as depicted in the method 1800 of FIG. 18.

The methods 1600 and 1800 just described operate on three color channels. However, fonts (and line art) are typically not a general RGB image. Rather, fonts (and line art) may be described as a blend (also referred to as "alpha" or $^{\alpha}$) between a foreground color and a background color. Assume that the blending coefficient at a location x is $^{\alpha}(x)$, the foreground color is f and the background color is b. Assume further that a filter output is expressed as L[ ]. Then, the output of a filter of the present invention applied to a font image may be expressed as:

$$L[f^{\alpha}(x)+b(1-{}^{\alpha}(x))] \tag{2}$$

Since L is linear, equation (2) may be expressed as:

$$fL[{}^{\alpha}(x)]+b(1-L[{}^{\alpha}(x)]) \tag{3}$$

As these expressions show, only alpha need be filtered. The results of the filtering can then be used as new blending coefficients between the foreground color and the background color. The following methods exploit this observation.

Figure 19:
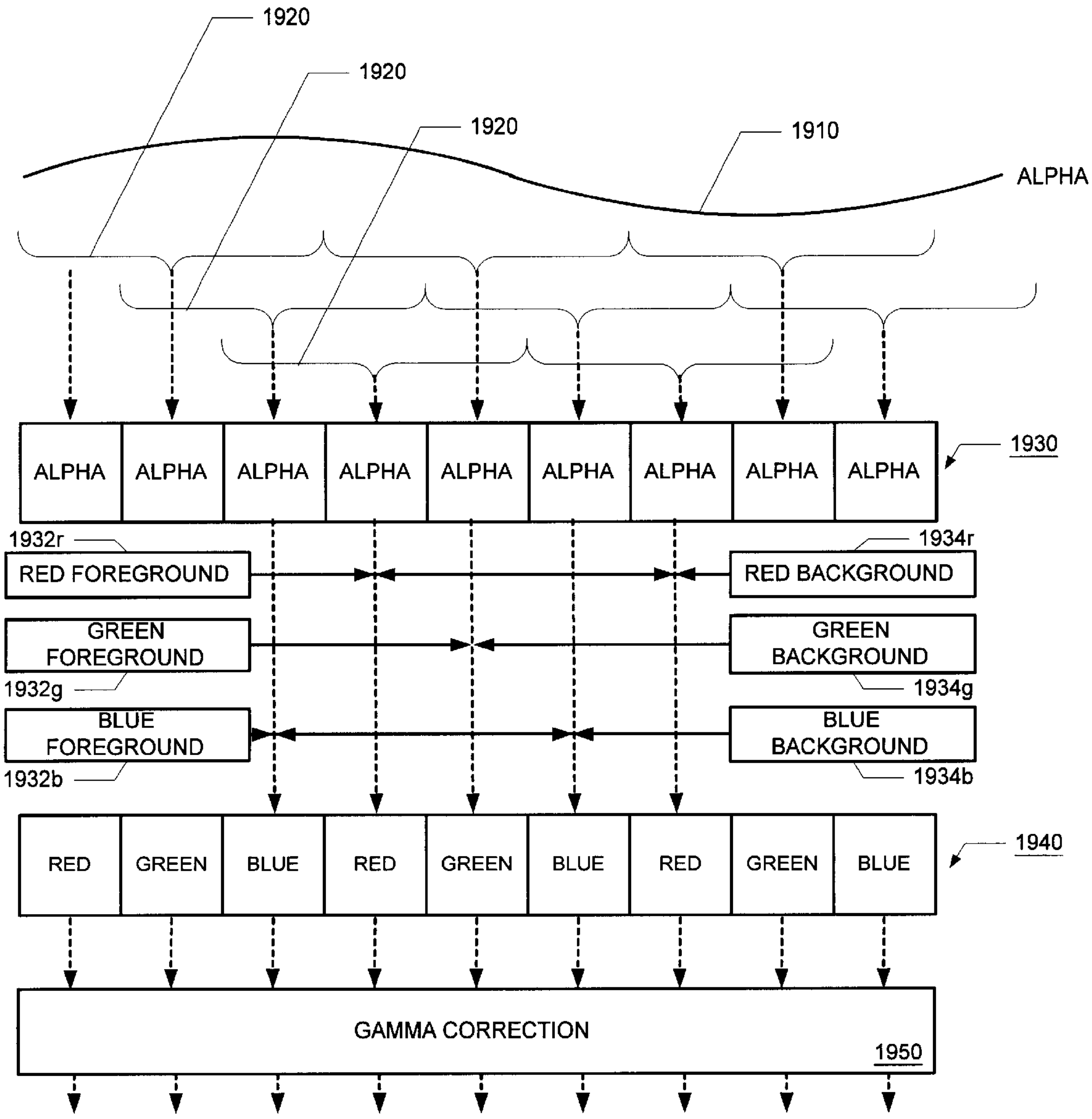
FIG. 19 illustrates the operation of a method for deriving sub-pixel element information from blend coefficient information, as well as foreground and background color information.
Figure 20:
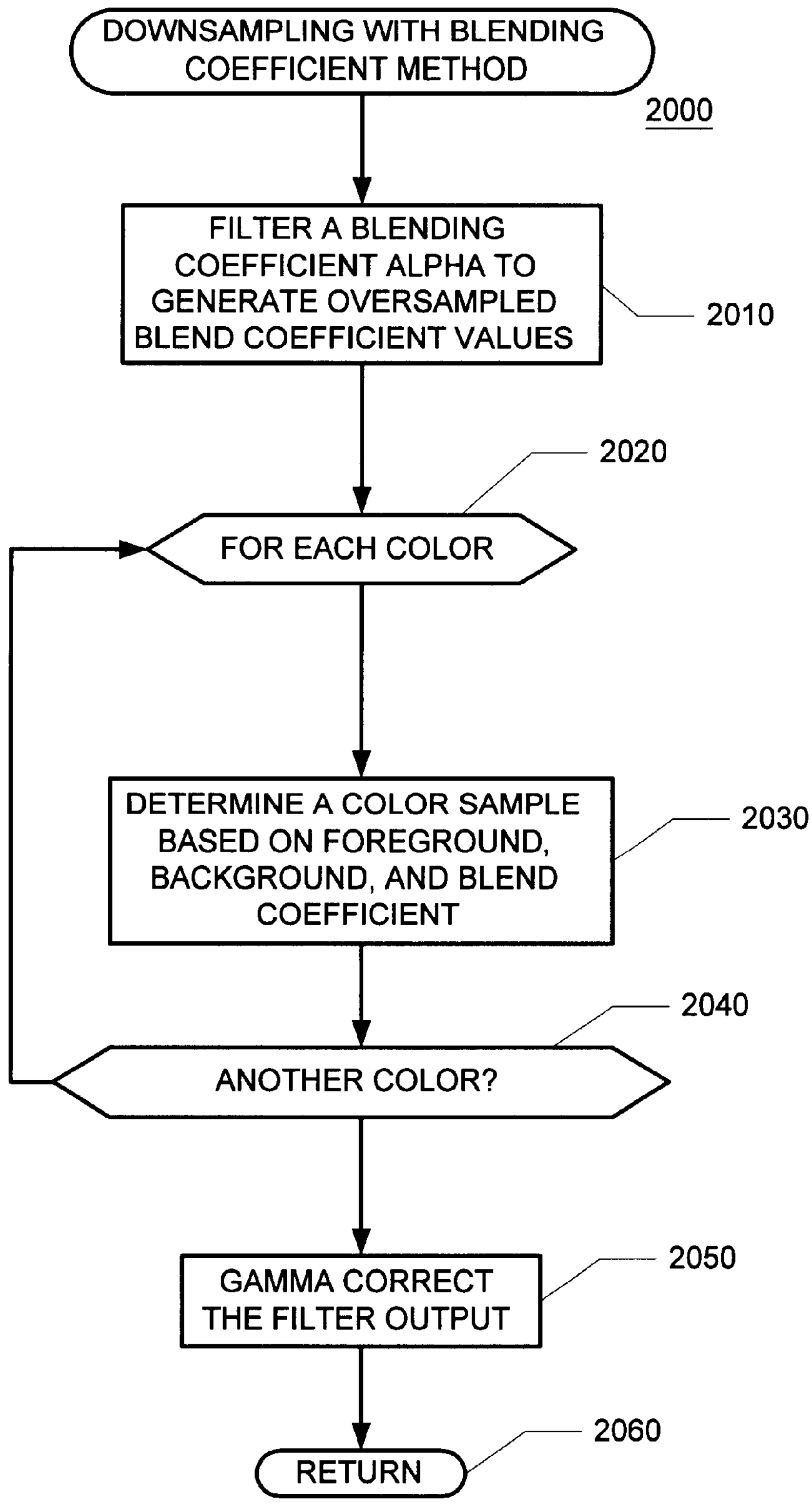
FIG. 20 is a high level flow diagram of that method.

FIG. 19 illustrates an operation of an exemplary resolution enhancement method 2000. The method 2000 may be used to effect the process 830 for combining displaced samples. FIG. 20 is a flow diagram of this method 2000. Referring to both FIGS. 19 and 20, an analytic blending coefficient (alpha) 1910 is filtered, using displaced filters (See, e.g., three times oversampling filters 1920.), to generate oversampled blend coefficient values 1930 as shown in act 2010. Then, as shown by loop 2020–2040, for each color, color samples 1940 are determined based on the foreground 1932, the background 1934, and the blend coefficient samples 1930. The output 1940 may then be gamma corrected (or adjusted) 1950 based on the gamma (or other) response of the display 560 on which the image is to be rendered as shown in act 2050. Although not shown in FIG. 19, an inverse display response (e.g., gamma) correction may be performed on the foreground 1932 and background 1934 colors before the blend operation. The method 2000 is then left via RETURN node 2060. As can be seen from FIG. 19, in one embodiment, there are three (3) alpha oversamples 1930 per pixel, one (1) per sub-pixel component.

As shown in FIG. 19, the separate colors may be processed in parallel rather than in a sequence of loops as depicted in the method 2000 of FIG. 20.

Figure 21:
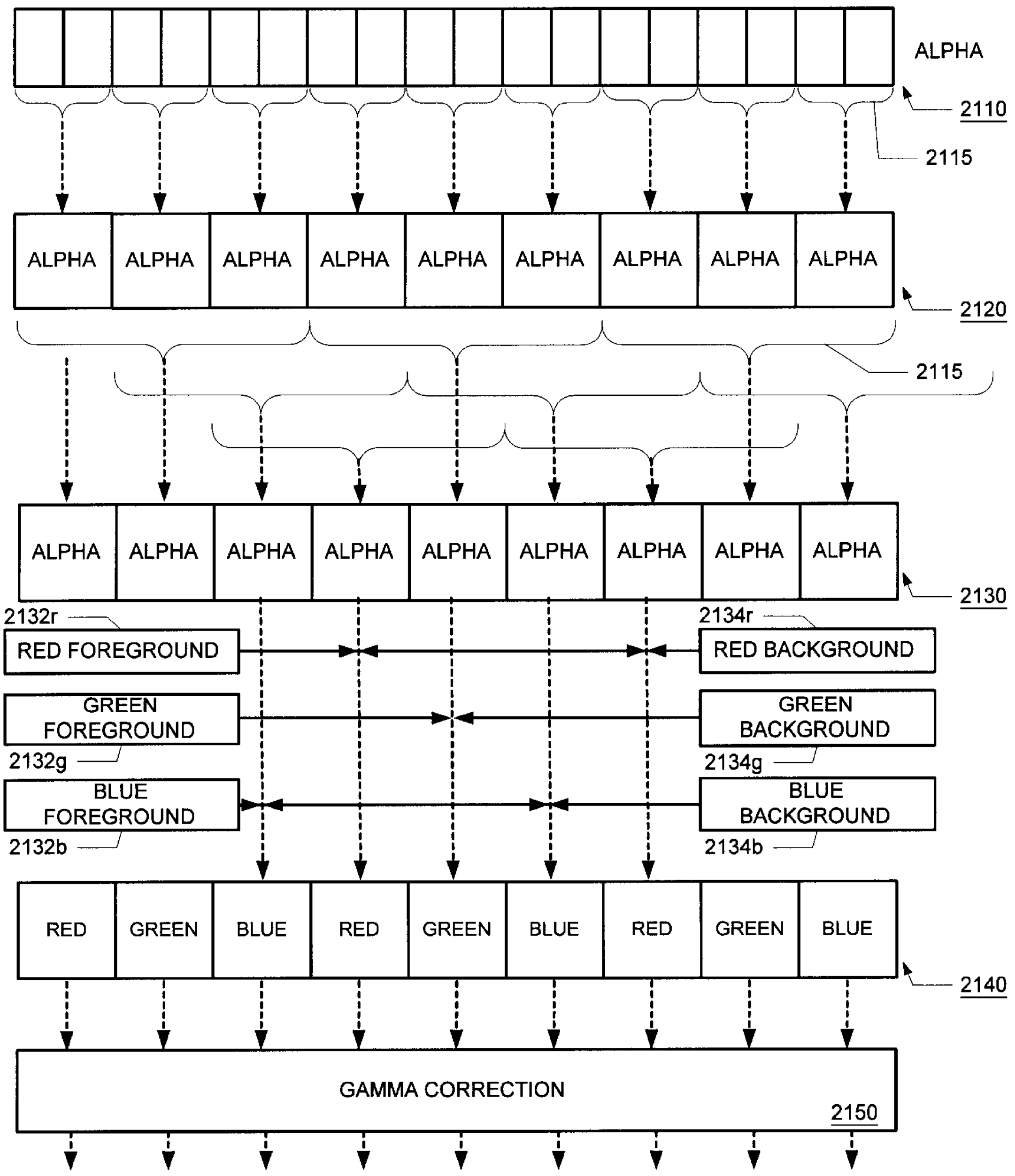
FIG. 21 illustrates the operation of a method for deriving sub-pixel element information from blend coefficient samples, as well as foreground and background color information.
Figure 22:
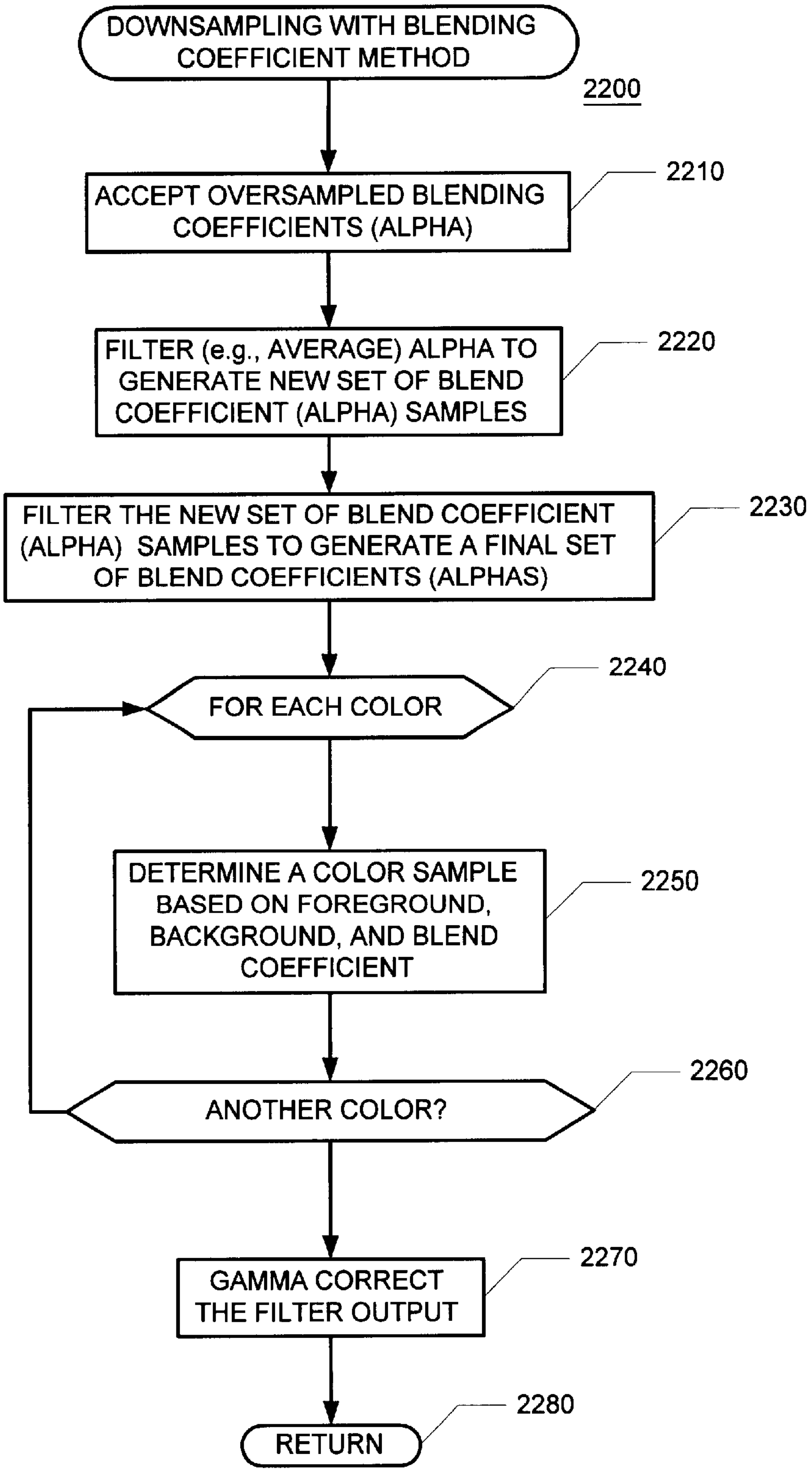
FIG. 22 is a high level flow diagram of that method.

FIG. 21 illustrates an operation of an exemplary resolution enhancement method 2200. FIG. 22 is a flow diagram of this method 2200. The method 2200 may be used to effect the process 830 for combining displaced samples. This method is somewhat of a hybrid between the method 1600 of FIG. 16 and the method 2000 of FIG. 20. Referring to both FIGS. 21 and 22, oversampled blending coefficient (alpha) samples 2110 are accepted as shown in act 2210. These oversampled samples are then filtered (e.g., averaged) (See bracket 2115.) to generate a new set of blend coefficients (alphas) 2120 as shown in act 2220. Then, as shown in act 2230, the new set of blend coefficients (alphas) 2120 are filtered again (See, e.g., the filters 2125.) to generate a final set of blend coefficients (alphas) 2130. The final set of blend coefficients (alsphs) 2130 may be cached. The process then continues as did the process 2000. More specifically, as shown by loop 2240–2250, for each color, color samples 2140 are determined based on the foreground 2132, the background 2134, and the final set of blend coefficient samples 2130. The output 2140 may then be gamma corrected (or adjusted) 2150 based on the gamma (or other) response of the display 560 on which the image is to be rendered as shown in act 2270. Although not shown in FIG. 21, an inverse display response (e.g., gamma) correction may be performed on the foreground 2132 and background 2134 colors before the blend operation. The method 2200 is then left via RETURN node 2280. As can be seen from FIG. 21, in one embodiment, there are three (3) alpha oversamples 2130 per pixel, one (1) per sub-pixel component.

As shown in FIG. 21, the separate colors may be processed in parallel rather than in a sequence of loops as depicted in the method 2200 of FIG. 22.

Figure 23:
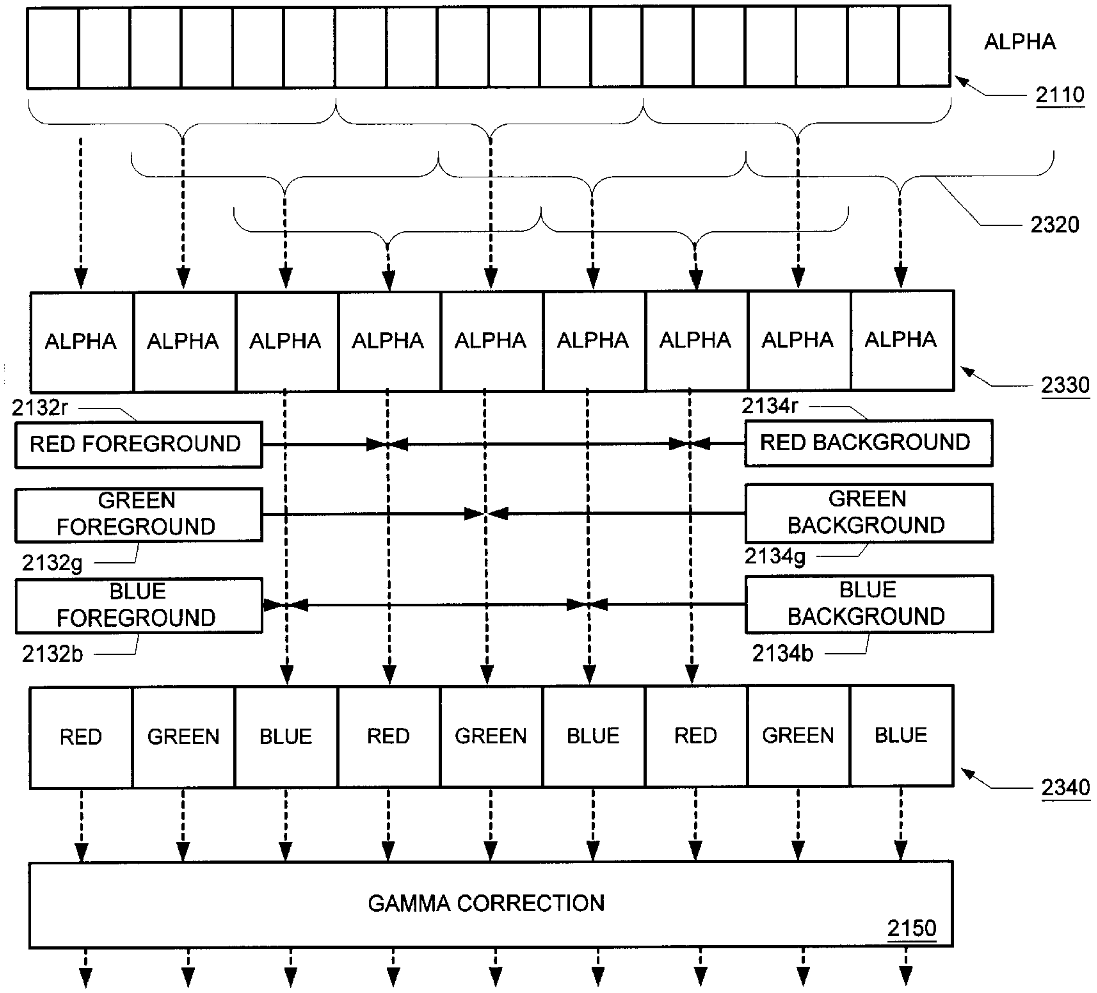
FIG. 23 illustrates the operation of an alternative method for deriving sub-pixel element information from blend coefficient samples, as well as foreground and background color information.

Notice from FIG. 21 that the first filtering (e.g., averaging) act 2220 and the second filtering act 2230 of the method 2200 effectively generate one (1) final blend coefficient (alpha) sample 2130 from six (6) oversampled blend coefficient (alpha) samples 2110. The method 2400 of FIG. 24 combines these two filtering operations into a single filtering operation. FIG. 23 illustrates an exemplary operation of the method 2400 of FIG. 24. The method 2400 may be used to effect the process 830 for combining displaced samples. Referring to both FIGS. 23 and 24, oversampled blending coefficient (alpha) samples 2110 are accepted as shown in act 2410. These oversampled samples are then filtered (See, e.g., the filters 2320.) to generate a final set of blend coefficients (alphas) 2330 as shown in act 2420. The process then continues as did the process 2200. More specifically, as shown by loop 2430–2450, for each color, color samples 2340 are determined based on the foreground 2132, the background 2134, and the final set of blend coefficient samples 2330. The output 2340 may then be gamma corrected (or adjusted) 2150 based on the gamma (or other) response of the display 560 on which the image is to be rendered as shown in act 2460. Although not shown in FIG. 23, an inverse display response (e.g., gamma) correction may be performed on the foreground 2132 and background 2134 colors before the blend operation. The method 2400 is then left via RETURN node 2470. As can be seen from FIG. 23, in one embodiment, there are three (3) alpha oversamples 2330 per pixel, one (1) per sub-pixel component.

Figure 24:
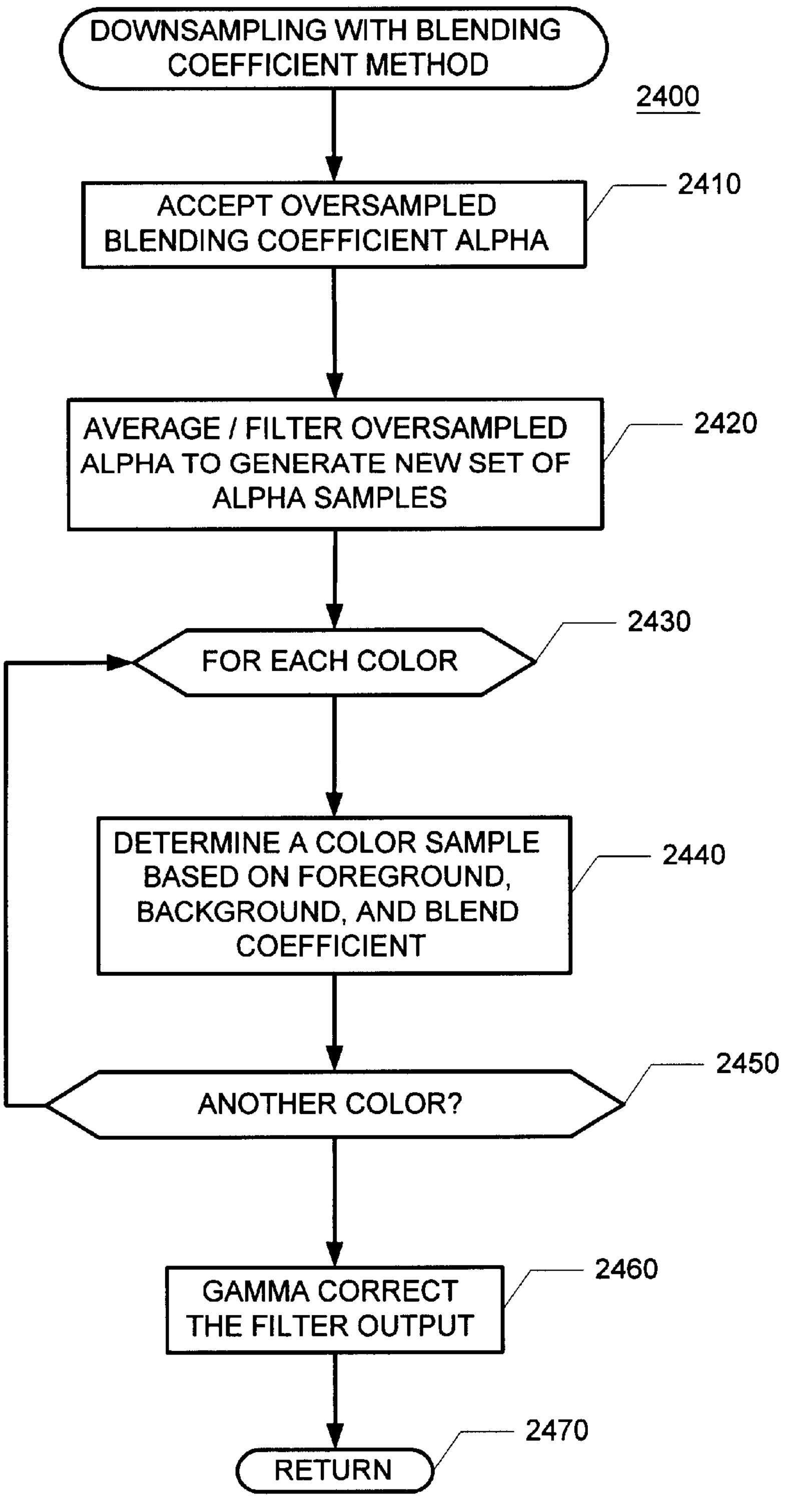
FIG. 24 is a high level flow diagram of that method.

As shown in FIG. 23, the separate colors may be processed in parallel rather than in a sequence of loops as depicted in the method 2400 of FIG. 24.

In the methods 2200 of FIG. 22 and 2400 of FIG. 24, it was assumed that the blend coefficient (alpha) would be applied to a constant foreground color 2132*r*, 2132*g*, 2132*b* and a constant background color 2134*r*, 2134*g*, 2134*b*. However, if the image, such as a character image, has a shaded background, such as a background having a color gradient for example, the blend coefficients (alphas) can be used to interpolate between a non-constant foreground and/or background colors.

Figure 25:
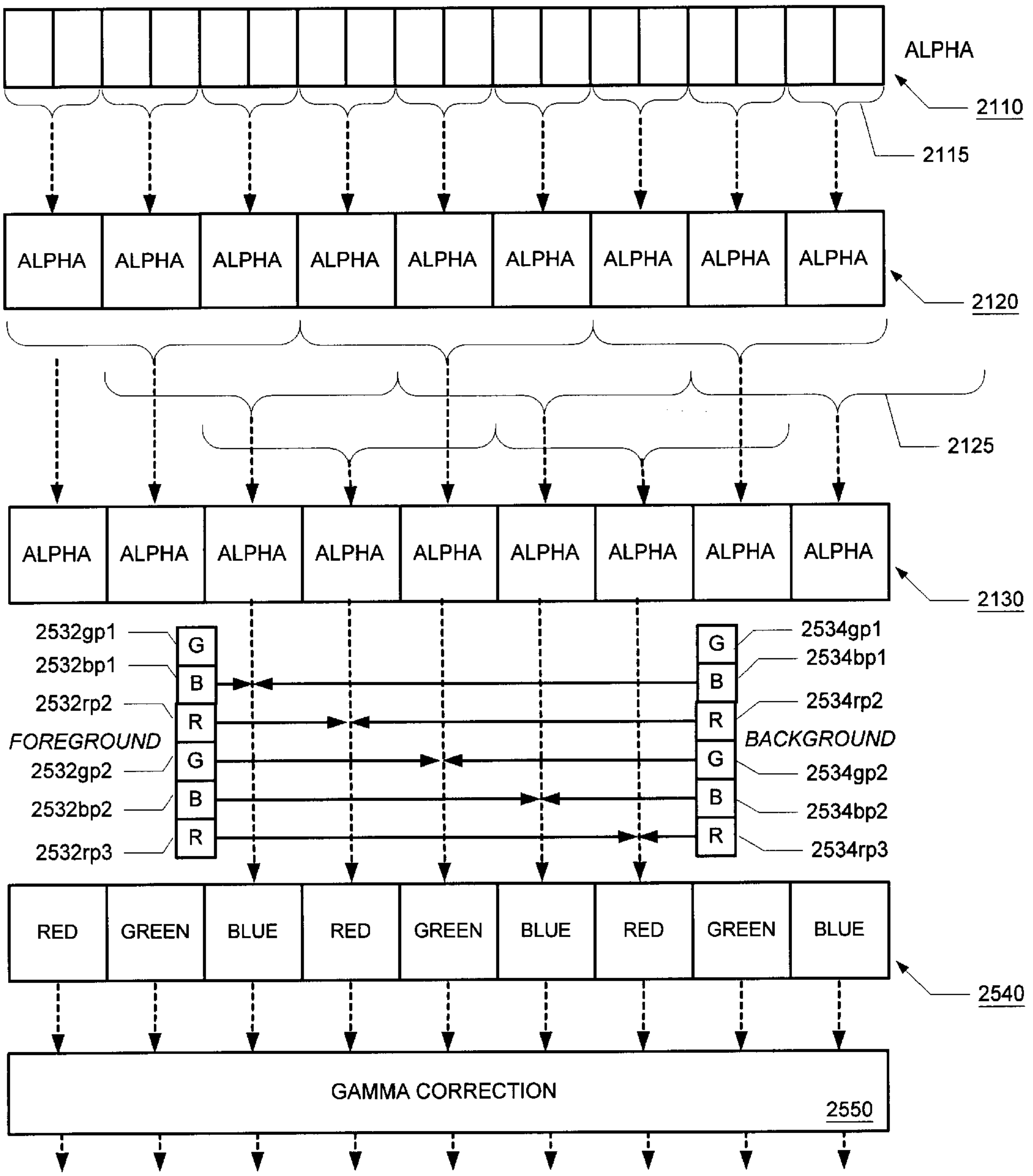
FIG. 25 illustrates the operation of a method for deriving sub-pixel element information from blend coefficient samples, as well as foreground and background color information, where the foreground and/or background color information may vary based on the position of a pixel within the image.
Figure 26:
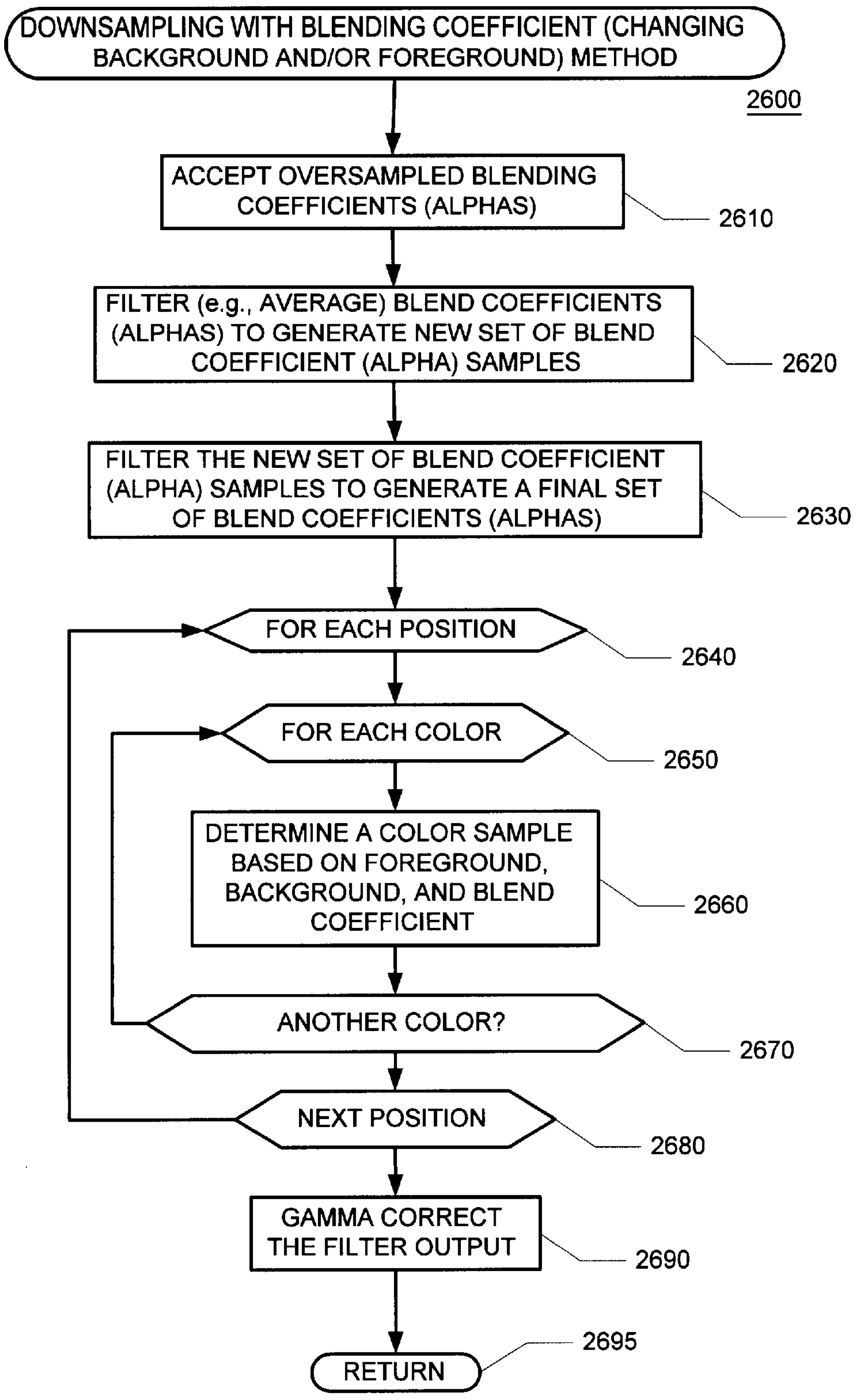
FIG. 26 is a high level flow diagram of that method.

The method 2600 of FIG. 26 is similar to the method 2200 of FIG. 22, but permits the foreground and/or background colors to change with position. The method 2600 may be used to effect the process 830 for combining displaced samples. FIG. 25 illustrates an example of the operation of the method 2600 of FIG. 26. Referring to both FIGS. 25 and 26, oversampled blending coefficient (alpha) samples 2110 are accepted as shown in act 2610. These oversampled samples are then filtered (e.g., averaged) (See bracket 2115.) to generate a new set of blend coefficients (alphas) 2120 as shown in act 2620. Then, as shown in act 2630, the new set of blend coefficients (alphas) 2120 are filtered (See, e.g., the filters 2125.) to generate a final set of blend coefficients (alphas) 2130. This final set of blend coefficients (alphas) 2130 may then be cached. As shown by nested loops 2640–2680 and 2650–2670, for each position and for each color (which may vary with position), color values 2540 associated with sub-pixel components are determined based on the foreground 2132 at the position, the background 2134 at the position, and the final set of blend coefficient samples 2130. In an alternative embodiment, these loops can be re-ordered such that a position loop is nested within a color loop. The output 2540 may then be gamma corrected (or adjusted) 2550 based on the gamma (or other) response of the display 560 on which the image is to be rendered as shown in act 2690. Although not shown in FIG. 25, an inverse display response (e.g., gamma) correction may be performed on the foreground 2532 and background 2534 colors before the blend operation. The method 2600 is then left via RETURN node 2695. As can be seen from FIG. 25, in one embodiment, there are three (3) alpha oversamples 2130 per pixel, one (1) per sub-pixel component.

As shown in FIG. 25, the separate colors, as well as the separate foreground and background colors at separate positions, may be processed in parallel rather than in a sequence of loops as depicted in the method 2600 of FIG. 26.

Figure 27:
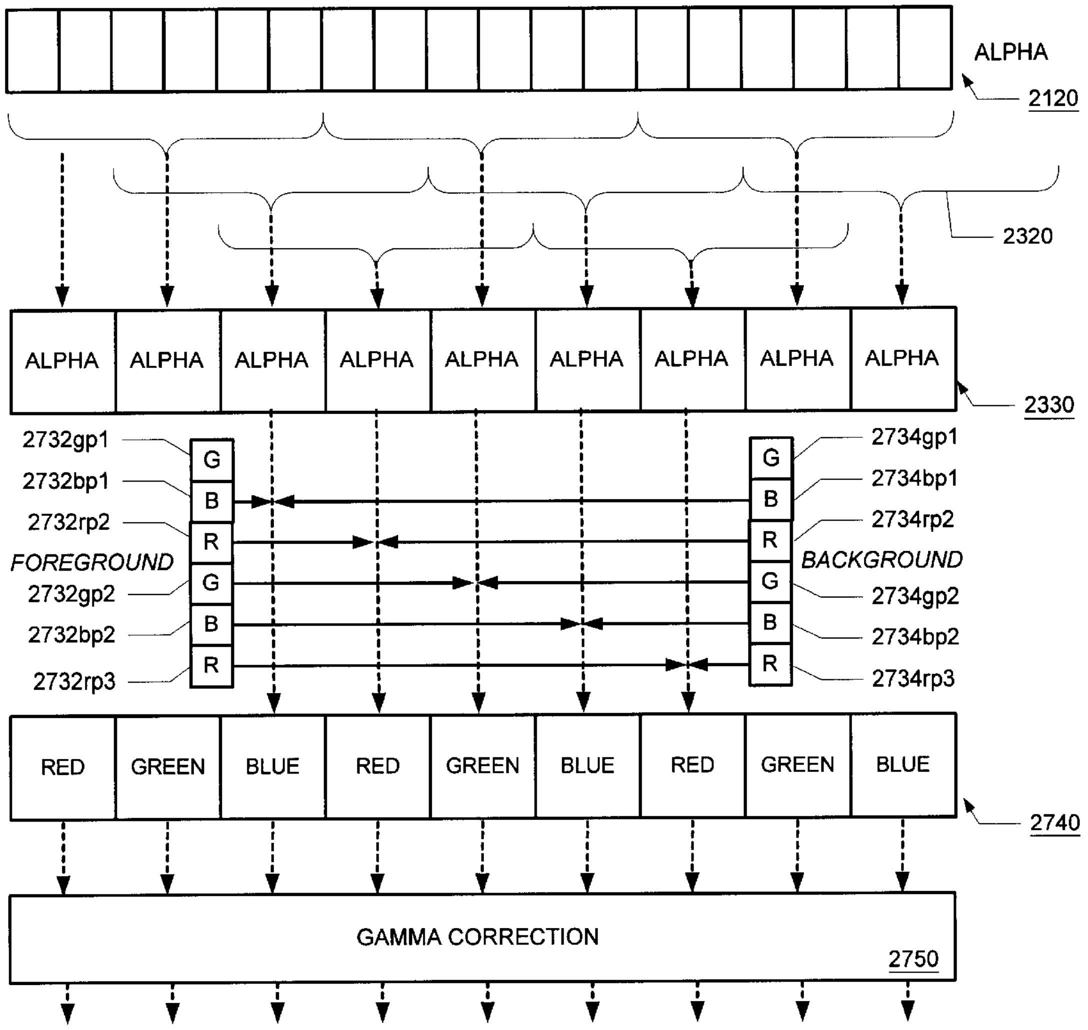
FIG. 27 illustrates the operation of an alternative method for deriving sub-pixel element information from blend coefficient samples, as well as foreground and background color information, where the foreground and/or background color information may vary based on the position of a pixel within the image.
Figure 28:
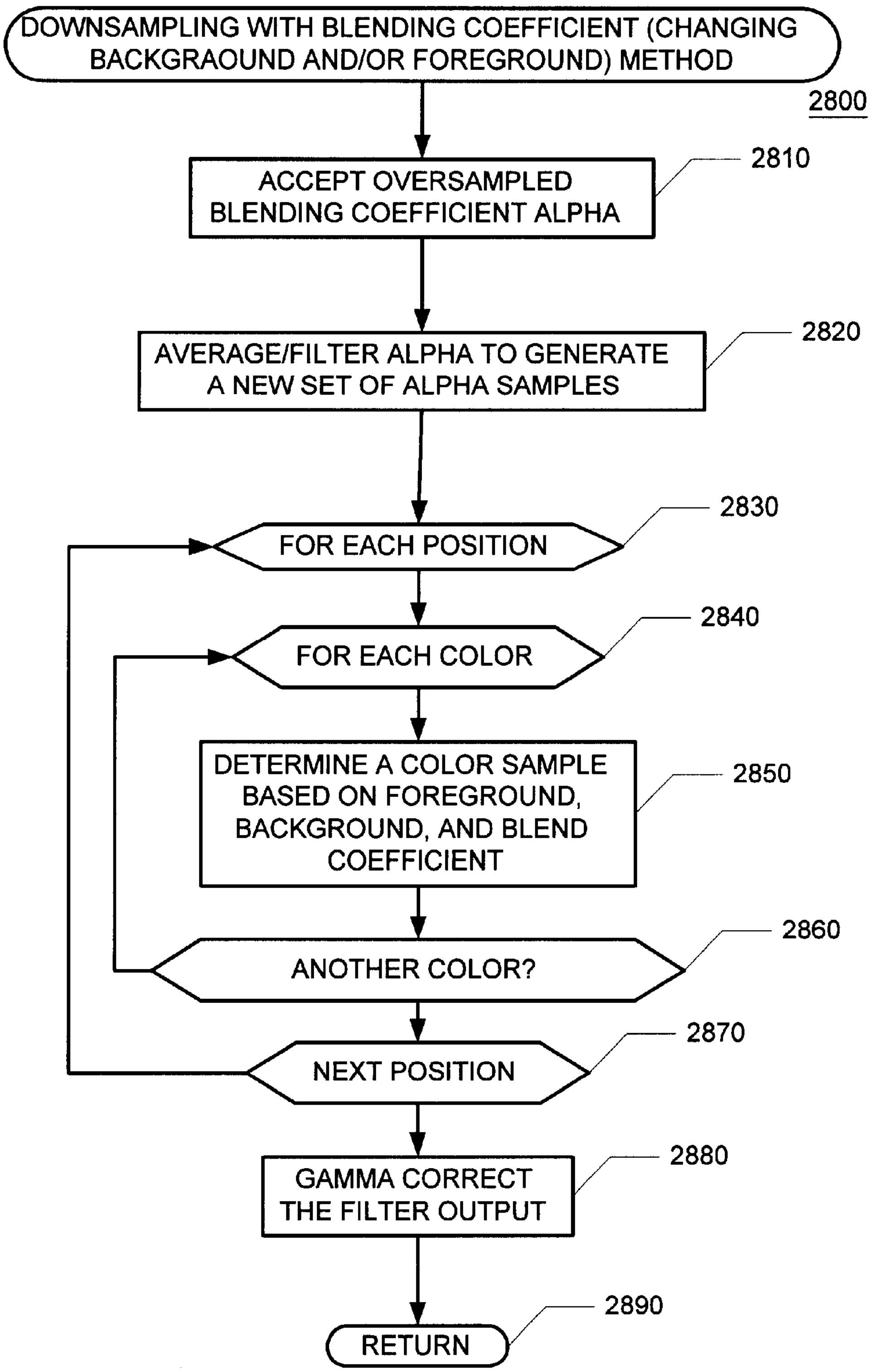
FIG. 28 is a high level flow diagram of that method.

The method 2800 of FIG. 28 is similar to the method 2400 of FIG. 24, but permits the foreground and/or background colors to change with position. Further, the method 2800 of FIG. 28 is similar to the method 2600 of FIG. 26 but combines the separate acts of filtering 2620 and 2630 into a single operation. The method 2800 may be used to effect the process 830 for combining displaced samples. FIG. 27 illustrates an example of the operation of the method 2800 of FIG. 28. Referring to both FIGS. 27 and 28, oversampled blending coefficient (alpha) samples 2110 are accepted as shown in act 2810. These oversampled samples are then filtered (See, e.g., the filters 2320.) to generate a final set of blend coefficients (alphas) 2330 as shown in act 2820. The method 2800 then continues as did the method 2600. More specifically, as shown by nested loops 2830–2870 and 2840–2860, for each position and for each color (which may vary with position), color samples 2740 are determined based on the foreground 2732 at the position, the background 2734 at the position, and the final set of blend coefficient samples 2330. In an alternative embodiment, these loops can be reordered such that a position loop is nested within a color loop. The output 2740 may then be gamma corrected (or adjusted) 2750 based on the gamma (or other) response of the display 560 on which the image is to be rendered as shown in act 2880. Although not shown in FIG. 27, an inverse display response (e.g., gamma) correction may be performed on the foreground 2732 and background 2734 colors before the blend operation. The method 2800 is then left via RETURN node 2890. As can be seen from FIG. 27, in one embodiment, there are three (3) alpha oversamples 2130 per pixel, one (1) per sub-pixel component.

As shown in FIG. 27, the separate colors may be processed in parallel rather than in a sequence of loops as depicted in the method 2800 of FIG. 28.

§ 4.3.3 Exemplary Filtering Methods

Figure 30:
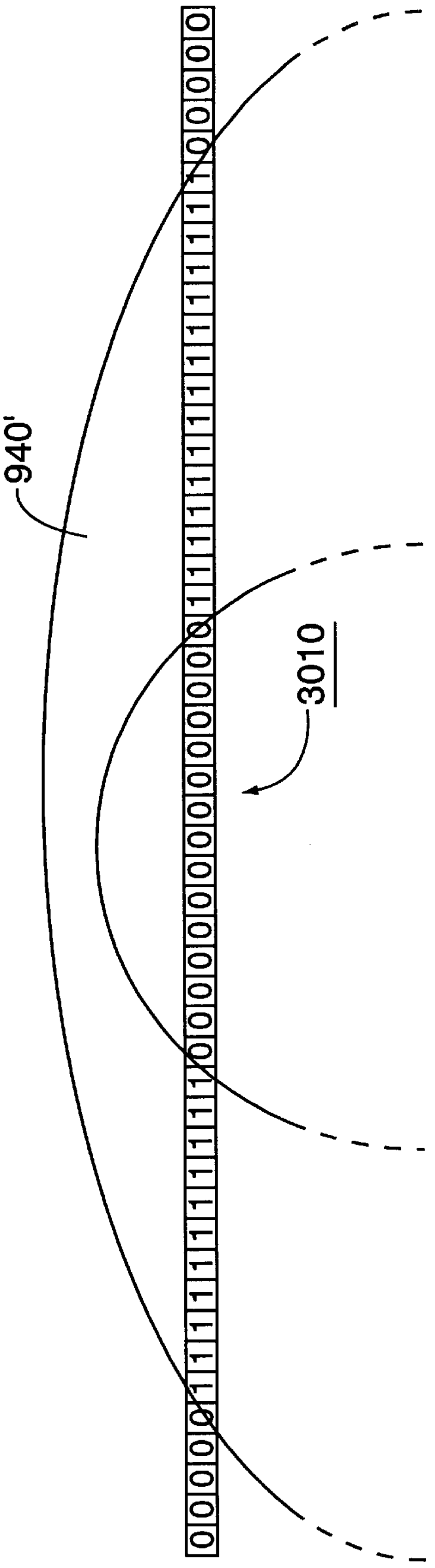
FIG. 30 illustrates samples derived from a portion of an overscaled character outline.

FIG. 30 illustrates a scan line 3010 from a portion of an overscaled character 940' (Recall, FIG. 9 in which the letter Q was overscaled in the horizontal direction.). In this example, each sample of the scan line 3010 has a value of “0” if its center is outside of the character outline 940' and a value of “1” if its center is within the character outline 940'. Other ways of determining the value of scanline 3010 samples may be used instead. For example, a sample of the scanline 3010 may have a value of “1” if it is more than a predetermined percentage (e.g., 50%) within the character outline 940', and a value of “0” if it is less than or equal to the predetermined percentage within the character outline 940'. These “samples” may correspond to alpha values, or color component values.

Figure 31:
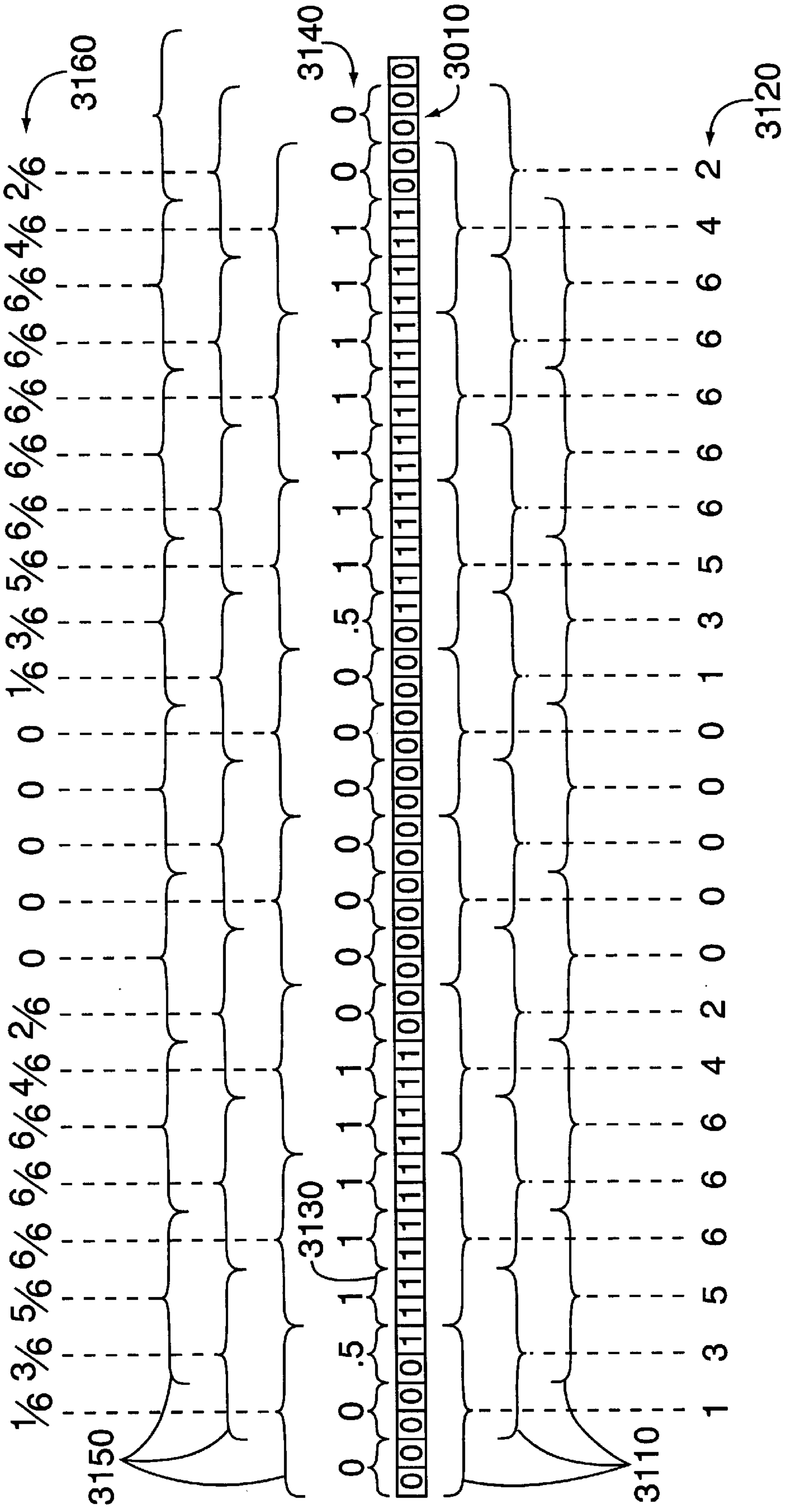
FIG. 31 illustrates the operations of alternative sample combination techniques.

FIG. 31 illustrates exemplary one-part and two-part filtering techniques which may be used to filter samples of a scanline 3010. The exemplary one-part filtering technique is illustrated below the scanline 3010 and the exemplary two-part filtering technique is illustrated above the scanline 3010.

In the exemplary one-part filtering technique illustrated below the scanline 3010, notice that filters, depicted as brackets 3110, operate on six (6) samples of the scanline 3010 and are offset by two (2) samples. The sums of the samples of the scanline 3010 within the filters 3110 are shown in line 3120. In this example, it is assumed that the scanline 3010 is derived from a character outline 940' overscaled six (6) times in the horizontal (or X) direction. For example, the display on which the character is to be rendered may include three (3) sub-pixel elements per pixel, and the overscaling factor may be 3N, where N=2. The two (2) sample offset between each of the filters 3110 may correspond to the N=2 component of the overscaling factor.

In the exemplary two-part filtering technique illustrated above the scanline 3010, notice that each filter of the first set of filters, depicted as brackets 3130, operate on two (2) samples of the scanline 3010 and are offset by two (2) samples. The averages of the samples of the scanline 3010 within the filters 3130 are shown in line 3140. Notice further that each filter of the second set of filters, depicted as brackets 3150, operate on three (3) results 3140 generated from the first set of filters 3130 and are offset by one (1) result 3140 (which corresponds to two (2) samples of the scanline 3010). The average of the results 3140 within each filter 3150 of the second set of filters is determined as shown by line 3160. Recall that in this example, it is assumed that the scanline 3010 is derived from a character outline 940' overscaled six (6) times in the horizontal (or X) direction. For example, the display on which the character is to be rendered may include three (3) sub-pixel elements per pixel, and the overscaling factor may be 3N, where N=2.

Although the exemplary filters were described as performing averaging or summing operations, other type of filters may be used. For example, a filter that weights certain samples more than others may be used.

§ 4.4 Conclusions

As can be appreciated from the foregoing description, the present invention can be used to improve the resolution of analytic image information, such as character information and line art for example, to be rendered on a patterned display device. Further, the present invention can be used to improved the resolution of ultra resolution image information, such as graphics for example, to be rendered on a patterned display device.

What is claimed is:

1. For use in a system for rendering an image on a device having a plurality of pixels and a plurality of separately controllable sub-pixel elements of different colors per pixel, a method for improving spatial resolution of an image that is rendered by processing image information, the method comprising:

accepting digital scan lines of the image information representing a discrete values of an image, the scan lines including at least two color components, each said scan line comprising at least two samples per sub-pixel element, wherein each at least two samples correspond to one of the color components;

applying first filters to the digital scan lines to produce oversampled scan lines, wherein each oversampled scan line comprises at least two new samples for each sub-pixel component that are derived from the filtering of the sets of the samples;

for each of the sub-pixel elements in each of the oversampled scan lines, applying second filters to the new samples to generate a separate filtered color value associated with each sub-pixel element, the second filter from which the separate filtered color value for a given sub-pixel element is derived being spatially displaced from the second filters applied for other sub-pixel elements, such that each separate filtered color value is derived from spatially different samples of the oversampled scan lines;

mapping each separate filtered color value to the sub-pixel element associated therewith, such that each pixel element in a pixel has a different separate filtered color value mapped thereto; and displaying the image by separately controlling each sub-pixel element using the separate filtered color value mapped thereto.

2. The method of claim 1 wherein each said scan line comprises exactly two samples per sub-pixel element.

3. The method of claim 1 wherein the second filters applied to the new samples comprise box filters, each of the box filters being centered at a spatial location corresponding to a sub-pixel element.

4. The method of claim 1 further comprising an act of gamma correcting the new samples.

5. For use in a system for rendering an image on a device having a plurality of pixels and a plurality of separately controllable sub-pixel elements per pixel, a method for improving spatial resolution of an image that is rendered by processing image information including blend coefficients defining a blend between a foreground color and a background color, the method comprising:

accepting a digital scan line of the image information representing discrete samples of an image, the discrete samples of the scan line including samples of blend coefficients defining a blend between the foreground color and the background color;

applying first filters to the digital scan line to produce an oversampled scan line for the samples of blend coefficients, wherein the oversampled scan line comprises at least two new samples for each sub-pixel element;

for each of the sub-pixel elements, applying a second filter to a set of at least two of the new samples of the blend coefficients to generate a filtered blend coefficient for each sub-pixel element, the second filter applied to each sub-pixel element being spatially displaced from the second filters applied for the other sub-pixel elements, such that each filtered blend coefficient is derived from spatially different samples;

applying the foreground color and the background color to each of the filtered blend coefficients to generate color values associated with the sub-pixel elements;

mapping each color value to the sub-pixel element associated therewith, such that each sub-pixel element in a pixel has a different color value mapped thereto; and displaying the image by separately controlling each sub-pixel element using the color value mapped thereto.

6. The method of claim 5 further comprising an act of gamma correcting the color values associated with the pixel sub-elements.

7. For use in a system for rendering an image on a device having a plurality of pixels and a plurality of separately controllable sub-pixel elements per pixel, a method for improving spatial resolution of an image that is rendered by processing image information including blend coefficients defining a blend between a foreground color and a background color, the method comprising:

accepting a digital scan line of the image information representing discrete samples of an image, the discrete samples of the scan line including blend coefficients defining a blend between the foreground color and the background color and further including at least two samples of the blend coefficients per sub-pixel element;

applying first filters to sets of the samples of the blend coefficients in the digital scan line to generate new samples by filtering the at least two samples of the blend coefficients per sub-pixel element;

for each of the sub-pixel elements, applying second filters to the new samples to generate a filtered blend coefficient associated with each sub-pixel element, the second filter from which the filtered blend coefficient for a given sub-pixel element is derived being spatially displaced from the second filters applied for other sub-pixel elements, such that each filtered blend coefficient is derived from spatially different samples;

applying the foreground color and the background color to each of the filtered blend coefficients to generate color values associated with the sub-pixel elements;

mapping each color value to the sub-pixel element associated therewith, such that each sub-pixel element in a pixel has a different color value mapped thereto; and displaying the image by separately controlling each sub-pixel element using the color value mapped thereto.

8. The method of claim 7 wherein the scan line includes exactly two samples per sub-pixel element.

9. The method of claim 7 wherein the second filters applied to the new samples comprise box filters, each of the box filters being centered at a spatial location corresponding to a sub-pixel element.

10. The method of claim 7 further comprising an act of gamma correcting the color values.

11. The method of claim 7 wherein at least one of the foreground and background color changes as a function of a position of the image.

12. For use in a system for rendering an image on a device having a plurality of pixels and a plurality of separately controllable sub-pixel elements of different colors per pixel, an apparatus for improving spatial resolution of an image that is rendered by processing image information, apparatus for processing image information, the apparatus comprising:

means for accepting digital scan lines of the image information representing a discrete values of an image, the scan lines including at least two color components, each said scan line comprising at least two samples per sub-pixel element, wherein each at least two samples correspond to one of the color components;

means for applying first filters to the digital scan lines to produce oversampled scan lines, wherein each oversampled scan line comprises at least two new samples for each sub-pixel component;

means, for each of the sub-pixel elements in each of the oversampled scan lines, for applying second filters to the new samples to generate a separate filtered color value associated with each sub-pixel element, the second filter from which the separate filtered color value for a given sub-pixel element is derived being spatially displaced from the second filters applied for other sub-pixel elements, such that each separate filtered color value is derived from spatially different samples of the oversampled scan lines;

means for mapping each separate filtered color value to the sub-pixel element associated therewith, such that each sub-pixel element in a pixel has a different separate filtered color value mapped thereto; and means for displaying the image by separately controlling each sub-pixel element using the separate filtered color value mapped thereto.

13. The apparatus of claim 12 wherein each said scan line comprises exactly two samples per sub-pixel element.

14. For use in a system for rendering an image on a device having a plurality of pixels and a plurality of separately controllable sub-pixel elements per pixel, an apparatus for improving spatial resolution of an image that is rendered by processing image information including blend coefficients defining a blend between a foreground color and a background color, the apparatus comprising:

means for accepting a digital scan line of the image information representing discrete samples of an image, the discrete samples of the scan line including blend coefficients defining a blend between the foreground color and the background color;

means for applying first filters to the digital scan line to produce an oversampled scan line for the blend coefficients, wherein the oversampled scan line comprises at least two new samples for each sub-pixel element; and for each of the sub-pixel elements, means for applying a second filter to a set of at least two of the new samples of the blend coefficients to generate a filtered blend coefficient for each sub-pixel element, the second filter applied for each sub-pixel element being spatially displaced from the second filters applied for the other sub-pixel elements, such that each filtered blend coefficient is derived from spatially different samples;

means for applying the foreground color and the background color to each of the filtered blend coefficients to generate color values associated with the sub-pixel elements;

means for mapping each other value to the sub-pixel element associated therewith, such that each sub-pixel element in a pixel has a different color value mapped thereto; and means for displaying the image by separately controlling each sub-pixel element using the color value mapped thereto.

15. For use in a system for rendering an image on a device having a plurality of pixels and a plurality of separately controllable sub-pixel elements per pixel, an apparatus for improving spatial resolution of an image that is rendered by processing image information including blend coefficients defining a blend between a foreground color and a background color, the apparatus comprising:

means for accepting a digital scan line of the image information representing discrete samples of an image, the discrete samples of the scan line including blend coefficients defining a blend between the foreground color and the background color and further including at least two samples of the blend coefficients per sub-pixel element;

means for applying first filters to sets of the samples of the blend coefficients in the digital scan line to generate new samples by filtering the at least two samples of the blend coefficients per sub-pixel element;

means for each of the sub-pixel elements, for applying second filters to the new samples to generate a filtered blend coefficient associated with each sub-pixel element, the second filter from which the filtered blend coefficient for a given sub-pixel element is derived being spatially displaced from the second filters applied for other sub-pixel elements, such that each filtered blend coefficient is derived from spatially different samples;

means for applying the foreground color and the background color to each of the filtered blend coefficients to generate color values associated with the sub-pixel elements;

means for mapping each color value to the sub-pixel element associated therewith, such that each sub-pixel element in a pixel has a different color value mapped thereto; and means for displaying the image by separately controlling each sub-pixel element using the color value mapped thereto.

16. The apparatus of claim 15 wherein the scan line includes exactly two samples per sub-pixel element.

17. The apparatus of claim 15 wherein at least one of the foreground and background color changes as a function of a position of the image.

18. A machine readable medium having stored instructions which, when executed by a machine used in a system for rendering an image on a device having a plurality of pixels and a plurality of separately controllable sub-pixel elements of different colors per pixel, performs the method of claim 1.

19. A machine readable medium having stored instructions which, when executed by a machine used in a system for rendering an image on a device having a plurality of pixels and a plurality of separately controllable sub-pixel elements of different colors per pixel, performs the method of claim 2.

20. A machine readable medium having stored instructions which, when executed by a machine used in an system for rendering an image on a device having a plurality of pixels and a plurality of separately controllable sub-pixel elements of different colors per pixel, performs the method of claim 5.

21. A machine readable medium having stored instructions which, when executed by a machine used in a system for rendering an image on a device having a plurality of pixels and a plurality of separately controllable sub-pixel elements of different colors per pixel, performs the method of claim 7.

22. A machine readable medium having stored instructions which, when executed by a machine used in a system for rendering an image on a device having a plurality of pixels and a plurality of separately controllable sub-pixel elements of different color per pixel, performs the method of claim 8.

23. A machine readable medium having stored instructions which, when executed by a machine used in a system for rendering an image on a device having a plurality of pixels and a plurality of separately controllable sub-pixel elements of different colors per pixel, performs the method of claim 11.

24. The method of claim 1, wherein:

the device having a plurality of pixels comprises a liquid crystal display device;

the plurality of separately controllable sub-pixel elements per pixel include a red sub-pixel element, a green sub-pixel element, and a blue sub-pixel element; and the second filter applied for each of the sub-pixel elements is a box filter centered about the particular sub-pixel element for which the box filter is applied and extends to an adjacent sub-pixel element on either side of said particular sub-pixel element.

25. The method of claim 5, wherein:

the device having a plurality of pixels comprises a liquid crystal display device;

the plurality of separately controllable sub-pixel elements per pixel include a red sub-pixel element, a green sub-pixel element, and a blue sub-pixel element; and the second filter applied for each of the sub-pixel elements is a box filter centered about the particular sub-pixel element for which the box filter is applied and extends to an adjacent sub-pixel element on either side of said particular sub-pixel element.

26. The method of claim 7, wherein:

the device having a plurality of pixels comprises a liquid crystal display device;

the plurality of separately controllable sub-pixel elements per pixel include a red sub-pixel element, a green sub-pixel element, and a blue sub-pixel element; and the second filter applied for each of the sub-pixel elements is a box filter centered about the particular sub-pixel element for which the box filter is applied and extends to an adjacent sub-pixel element on either side of said particular sub-pixel element.

27. For use in a system for rendering an image on a device having a plurality of pixels and a plurality of separately controllable sub-pixel elements of different colors per pixel, a method for generating color values for sub-pixel components to improve spatial resolution of the image, the method comprising:

accepting discrete values of one or more color scan lines, wherein the discrete values of each color scan line include one or more samples per sub-pixel component;

filtering the discrete values of each color scan line to generate an oversampled color scan line for each color scan line, wherein each oversampled scan line includes one or more new samples per sub-pixel component; and applying box filters to the new samples of each oversampled color scan line to generate color values that are associated with each sub-pixel component, wherein the box filters of each oversampled color scan line are displaced with respect to other oversampled scan lines.

28. A method as defined in claim 27, wherein the box filters are centered at locations that correspond to centers of the sub-pixel components.

29. A method as defined in claim 27, further comprising applying gamma correction to the color values.

* * * * *

UNITED STATES PATENT AND TRADEMARK OFFICE

CERTIFICATE OF CORRECTION

PATENT NO. : 6,393,145 B2 Page 1 of 1
DATED : May 21, 2002
INVENTOR(S) : Claude Betrisey et al.

It is certified that error appears in the above-identified patent and that said Letters Patent is hereby corrected as shown below:

Column 17,
Line 8, after “inputs 1110” replace “are” with -- is --

Column 18,
Line 34, after “per pixel, if” replace “$N \geqq 3$” with -- $N \geq 3$ --

Column 23,
Line 20, after “such that each” replace “pixel” with -- sub-pixel --
Line 54, after “the second filter applied” replace “to” with -- for --

Column 26,
Line 43, after “by a machine used in” replace “an” with -- a --

Signed and Sealed this

Twenty-eighth Day of January, 2003

JAMES E. ROGAN
*Director of the United States Patent and Trademark Office*